(12) United States Patent
Pinhas et al.

(10) Patent No.: US 12,271,638 B1
(45) Date of Patent: Apr. 8, 2025

(54) RESERVATION PERSISTENCE IN DISTRIBUTED BLOCK STORAGE SYSTEMS

(71) Applicant: Amazon Technologies, Inc., Seattle, WA (US)

(72) Inventors: Barak Pinhas, Ganei Tikva (IL); Swapnil Vinay Dinkar, Seattle, WA (US); Andrew Boyer, Bainbridge Island, WA (US); Yonatan Divinsky, Tel Aviv (IL); Alex Friedman, Hadera (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/414,210

(22) Filed: Jan. 16, 2024

Related U.S. Application Data

(60) Provisional application No. 63/584,729, filed on Sep. 22, 2023.

(51) Int. Cl.
*G06F 3/06* (2006.01)

(52) U.S. Cl.
CPC ............ *G06F 3/067* (2013.01); *G06F 3/0622* (2013.01); *G06F 3/0659* (2013.01)

(58) Field of Classification Search
CPC ....... G06F 3/067; G06F 3/0622; G06F 3/0659
See application file for complete search history.

(56) References Cited

U.S. PATENT DOCUMENTS

| | | | |
|---|---|---|---|
| 7,313,636 B2 | 12/2007 | Qi | |
| 9,747,039 B1 | 8/2017 | Coleman | |
| 10,235,097 B2 | 3/2019 | Singh | |
| 11,544,000 B2 | 1/2023 | Furey | |
| 11,580,041 B2 | 2/2023 | Prabhakar | |
| 11,625,180 B1 | 4/2023 | Dinkar | |
| 2014/0082749 A1* | 3/2014 | Holland | G06F 21/60 726/29 |
| 2017/0091256 A1* | 3/2017 | Gordon | G06F 16/93 |
| 2018/0349269 A1* | 12/2018 | Garg | G06F 3/0649 |
| 2020/0125537 A1 | 4/2020 | Busick | |
| 2020/0241613 A1 | 7/2020 | Lakshman | |

OTHER PUBLICATIONS

U.S. Appl. No. 18/478,349, filed Sep. 29, 2023, Barak Pinhas, et al.
U.S. Appl. No. 18/478,581, filed Sep. 29, 2023, Barak Pinhas, et al.

* cited by examiner

*Primary Examiner* — Nicholas J Simonetti
(74) *Attorney, Agent, or Firm* — Alexander A. Knapp; Kowert, Hood, Munyon, Rankin & Goetzel, P.C.

(57) ABSTRACT

A storage object and an associated permissions record is stored at a storage server. The permissions record indicates that some storage consumers are not permitted to perform a type of I/O operation on the storage object. In response to detecting that an event of a deletion triggering type with respect to the records, a modified version of the permissions record is stored at the server, indicating that the storage consumers remain prohibited from performing the I/O operations. In response to receiving a command to perform a particular I/O at the server after the modified version has been stored, the modified version is used to process the command.

20 Claims, 11 Drawing Sheets

Reservation holders, registrants and non-registrants can be compute instances or other storage consumers/clients; the reserved entity can be a logical volume, managed by the block-storage service (BSS), with a given logical volume supporting attachments to multiple storage consumers/clients Table 200

| Reservation Type | Reservation Holder | | Registrant | | Non-Registrant | | Reservation Holder Definition |
|---|---|---|---|---|---|---|---|
| | Read | Write | Read | Write | Read | Write | |
| Write Exclusive | Y | Y | Y | Y | Y | N | One Reservation Holder |
| Exclusive Access | Y | Y | N | N | N | N | One Reservation Holder |
| Write Exclusive - Registrants Only | Y | Y | Y | Y | Y | N | One Reservation Holder |
| Exclusive Access - Registrants Only | Y | Y | Y | Y | N | N | One Reservation Holder |
| Write Exclusive - All Registrants | Y | Y | Y | Y | Y | N | All Registrants are Reservation Holders |
| Exclusive Access - All Registrants | Y | Y | Y | Y | N | N | All Registrants are Reservation Holders |

"Y" indicates that the command (read or write) is permitted according to NVMe 1.4 standard; "N" that the command is not permitted

FIG. 2

Programmatic detachment of last-remaining attached reservation holder  515

Shutdowns/terminations/restarts of last-remaining attached reservation holder 525 (can be planned or unplanned)

Customer-defined event  545

RESERVATION PERSISTENCE IN DISTRIBUTED BLOCK STORAGE SYSTEMS

This application claims benefit of priority to U.S. Provisional Application No. 63/584,729 filed Sep. 22, 2023, titled "Reservation Persistence In Distributed Block Storage Systems," which is hereby incorporated by reference in its entirety.

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments such as compute instances or virtual machines are frequently supported by block-based storage. Such block storage provides a storage system that is able to interact with compute instances through a series of standardized storage calls that render the block storage functionally agnostic to the structural and functional details of the logical volumes that it supports and the operating systems executing on the compute instances to which it provides storage availability. In scenarios in which I/O operations can be directed to a given logical volume from multiple compute instance, access control policies chosen by the customers can be enforced by the block storage service.

BRIEF DESCRIPTION OF DRAWINGS

FIG. 2 illustrates examples of reservation types which may be supported for controlling accesses from client compute instances to logical volumes of a block storage service, according to at least some embodiments.

FIG. 5 illustrates examples of event types which may, by default, trigger deletion of access permissions records of logical volumes, according to at least some embodiments.

Figure 1:
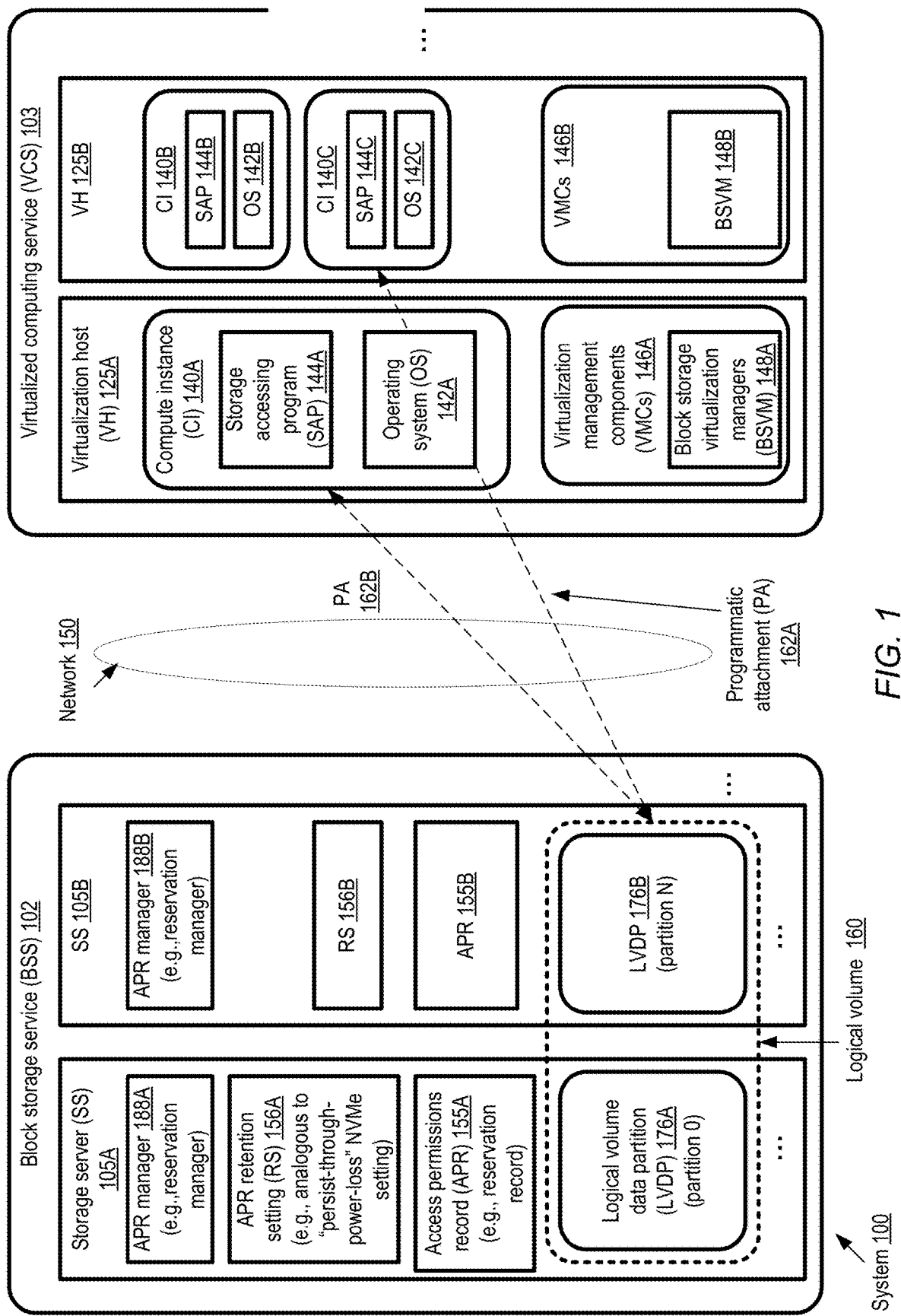
FIG. 1 illustrates an example system environment in which a block storage service may enforce client-specified retention settings for access permissions records pertaining to logical volumes that may be accessed from multiple compute instances, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

A block storage service can allow users to create and attach persistent storage volumes to their virtual machines or compute instances to store data. Multiple volumes may be attached to a single instance, and such a service can also include a multi-attach feature that enables users to attach a single volume to multiple instances. Each instance to which this shared volume is attached can have full read permission, and users can manage (and set up policies to manage) which instances have write access. For example, users can use NVMe (Non-Volatile Memory-Express) reservation protocols to create and manage reservations that control and coordinate access from multiple instances to a shared volume. Such reservations are used by shared storage applications to ensure data consistency.

However, if an instance terminates or "detaches" from the volume, the storage service may typically remove the reservation, thereby freeing up an attachment slot for a different instance. This means that if the detached instance is the sole reservation holder, the reservation can be lost. Reservation loss may introduce unexpected errors into the data stored on the volume. To address this challenge, a block storage service according to the present disclosure can create an additional slot in a volume's reservation table to represent a storage controller, such as an NVMe controller, which can remain attached to the volume even if all attached instances suddenly terminate or otherwise detach. This slot may only be released by an explicit command from the user, such as a command to release their reservation on the volume, thereby preventing inadvertent reservation loss.

Accordingly, the present disclosure relates to methods and apparatus for enforcing customer-chosen retention settings for access permission metadata of logical volumes established at a cloud based block storage service (BSS). The access permission metadata can include read and write permissions currently granted on a given logical volume to respective storage clients (for example, compute instances or virtual machine instances of a virtualized computing service (VCS) of the cloud computing environment) that are programmatically attached to the logical volume, and hence can submit input/output (I/O) commands to the logical volume on behalf of applications running at the storage clients. In many cases, the storage clients can be used to run complex clustered applications, with different components of the applications running at each storage client and performing reads and writes on a shared logical volume over a network at very high rates.

The BSS can be referred to in various implementations as an elastic block storage service, a cloud disks service, a managed disk service, a cloud block storage service, a persistent disk service, or a block volumes service. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. The term BSS client or storage client represents instructions that enable a compute instance to connect to, and perform I/O operations at, a remote data volume (e.g., a data volume stored on a physically separate computing device accessed over a network). The client may be implemented on an offload card that is connected to and controls the server that includes the processing units (e.g., CPUs or GPUs) used by the compute instance. As used herein, the term "storage server" or drive "hosting" a volume refers to that storage device storing at least a portion (e.g., a partition, a set of blocks, recently logged data, or flushed data) of the data of the volume and implementing instructions for managing that portion of the volume (e.g., handling I/O to and from the volume, replication of the volume, transfer of volume data to and from other storage systems) The storage volumes managed at a BSS can be referred to in various implementations as virtualized block storage volumes, cloud disks, storage disks, cloud volumes, logical volumes, disks, block volumes or simply as volumes. In general, a volume can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary (non-primary) replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary or non-primary replicas.

As indicated above, a BSS can support NVMe reservations for managing access control to at least some volumes (such as volumes which can each be attached to multiple compute instances using the multi-attach capability). NVMe reservations is a set of industry-standard storage fencing protocols, which enable users to create and manage reservations that control and coordinate access from multiple instances to a shared volume. Reservations can be used by shared storage applications to ensure data consistency. The BSS can support commands to register, unregister or replace a reservation key as defined in the NVMe specification. A registration key can be used to identify and authenticate an instance. Registering a reservation key with a volume creates an association between the instance and the volume. In some implementations, an instance may have to be registered with a volume before the instance can acquire a reservation. The BSS can also support commands to acquire a reservation on a volume, preempt a reservation, and/or abort a reservation. A variety of reservation types defined in NVMe specifications can be supported by a BSS, including but not limited to Write Exclusive, Exclusive Access, Write Exclusive-Registrants Only, Exclusive Access-Registrants Only, Write Exclusive-All Registrants and Exclusive Access-All Registrants. Commands to release or clear a reservation held on a volume, and provide a reservation report (e.g., a description of a registration and reservation status of a volume) can also be supported by a BSS. In NVMe terminology, the term "namespace" refers to a collection of logical block addresses accessible to host software (e.g., software running at a compute instance). A namespace ID is an identifier used by an NVMe controller to provide access to a namespace. A namespace does not necessarily refer to a physically isolated set of blocks, but rather represents an isolation of logical blocks addressable by the software. Namespaces can be represented in different ways depending on the operating system being used at the host or server from which storage is being accessed. For example, in some operating systems, a unique identifier such as/dev/nvme0n1 may be used to refer to a namespace 1 (n1) of controller 0 (nvme0). The available storage may be divided into namespaces for a variety of reasons, such as for logical isolation, multi-tenancy, security isolation (e.g., encryption per namespace), write-protecting a namespace for recovery purposes, and so on. In the context of a BSS, a volume (or a portion of a volume) can correspond to, or be represented as, an NVMe namespace. As defined in the NVMe standard, a controller is an interface between a host (from which storage-related commands are issued) and the NVMe storage subsystem. There can be several types of controllers, such as I/O controllers, discovery controllers and administrative controllers. In some implementations in which the BSS is being used for storage volumes accessed by compute instances running on virtualization servers of a VCS, NVMe controllers may represent one layer of software run at the virtualization hosts, and the "host" layer (in the NVMe sense) may comprise another layer of software at the virtualization hosts.

The access permission metadata of a BSS volume, which can be set up and then changed dynamically as needed via administrative commands from the storage clients or from the BSS customers, ensure that the data stored on the logical volume remains consistent and is not damaged or corrupted (for example by concurrent unprotected writes to the same portion of the data). The retention settings can indicate whether or not the customer wants access permission metadata of a logical volume to be retained or persisted across certain types of events, such as programmatic detachment or shutdowns/restarts of all compute instances which happen to be attached to a logical volume and have been granted permissions to access/modify the logical volume. Such events can be treated at a cloud-based BSS as the cloud computing equivalents of power-loss events described in some storage standards (such as some versions of NVMe). The storage standards can describe settings (such as "Persist-Through-Power-Loss" or PTPL) which give storage customers the ability to indicate whether access permission metadata of specified storage objects is to be retained across power-loss events. Applications that use the BSS may expect to be able to utilize and change such settings as needed, even though the concept of power-loss events at a single non-cloud storage server does not translate directly to highly-distributed systems of cloud-based storage systems—for example, the cloud-based storage systems may not support commands to power-off storage or other resources in the cloud, whereas programmatically powering off individual storage devices or servers outside the cloud environment is typically straightforward. As such, support for customer-specified retention settings can enable a cloud-based BSS to more fully comply with features defined in such storage standards.

Deletion of access permission metadata can sometimes have undesired or unexpected consequences from the application perspective. If the access permission metadata of a logical volume is deleted, for example when the last-remaining attached compute instance being used to run a clustered application restarts unexpectedly, the next compute instance which attaches to the logical volume can potentially perform operations such as writes which may not have been intended (from the perspective of the clustered application) to be allowed. In order to once again start enforcing the kinds of access permissions which happened to be in effect before the deletion, a set of administrative commands (e.g., a command to acquire and set an NVMe reservation of the type which was in effect earlier) is needed. In order to avoid such scenarios, customers can use programmatic interfaces of the BSS (e.g., application programming interfaces or APIs invoked from the compute instances) to specify the retention policies, and thereby ensure that the access permission metadata of their logical volumes is only deleted or reset in response to explicit commands to do so.

In a block-based storage system such as a BSS, data is typically broken down into independent fixed-size blocks or pieces, with each block managed as an individual piece of data storage. A complete piece of information, such as a data file, is stored in multiple, potentially non-sequential blocks. A given logical volume of the BSS is a virtualized representation of a collection of blocks which can be mounted or attached to compute instances to store data to which read and/or write access is required by the applications (and/or the operating systems) of the compute instances. Often, large logical volumes are subdivided into partitions, with individual partitions being stored at physical storage devices (e.g., solid state drives, magnetic disks and the like) at respective storage servers (SSs) of the BSS. Furthermore, in some cases, to provide a high level of availability and fault tolerance, an individual partition may be replicated, e.g., at a primary SS and one or more non-primary SSs designated for the partition. As such, a given logical volume and its storage clients can collectively be described as a distributed system, with the data of the logical volume potentially being distributed among several SSs of the BSS, and with I/O commands potentially being sent to the logical volume from multiple compute instances over network links.

In some cases, as part of its access control features, the BSS can support reservations for logical volumes, similar to the kinds of persistent reservations described in the NVMe 1.4 specification. In such cases, the access permission metadata for a logical volume can include a reservation record that indicates the reservation type currently in use for the logical volume, the compute instance which is currently the holder of the reservation (or in some cases multiple compute instances which currently hold the reservation), which compute instances are designated as "registrants" (entities for which a respective registration key has been provided to or selected at the BSS for the logical volume, permitting the compute instances to issue certain types of reservation-related commands), and so on. The "Persist Through Power Loss" (PTPL) setting is a feature defined in some versions of NVMe specifications. PTPL can be set programmatically by NVMe customers to indicate whether the state of the reservation of an NVMe namespace (logically equivalent to a BSS logical volume) is to be retained across power loss events at the device or host at which NVMe-style storage is accessed. The retention settings functionality introduced above can be used to provide the logical equivalent of the PTPL feature, applied to logical volumes implemented in a distributed manner at a cloud computing environment. Note that as indicated above, the "power loss" events for which the PTPL feature is defined do not have a one-to-one correspondence with single events in the distributed environment of a BSS and a VCS. In addition, a BSS may at least in some cases not support "power-off" commands for logical volumes. As such, other types of events can be treated at the BSS as the equivalent of the power loss events for which the PTPL setting is defined. Such events can include, among others, the programmatic detachment of the last-remaining attached compute instance which holds a reservation on a logical volume, a shutdown (planned or unplanned) of the last-remaining attached compute instance/reservation holder, and so on.

By allowing customers to specify retention settings for the access permission metadata of their logical volumes, the BSS can help ensure that the expectations of customer applications with regard to how and when access permission information is deleted can be met. Customers can in some cases define the types of events across which the access permission metadata is to be retained, and/or the types of events whose occurrence is to lead to the deletion of the access permission metadata. Different retention settings can be specified for respective logical volumes if desired. Access permission metadata of the kind for which retention settings can be chosen by BSS customers can also be referred to as access permissions records, access control metadata or (in scenarios in which NVMe-style reservations are supported) reservation records.

After a retention setting is obtained at a BSS (e.g., at a storage server of the BSS, or at an administrative or control plane component of the BSS) with regard to access permission metadata of a given logical volume, indicating the kinds of events across which the metadata is to be retained, the retention setting may be stored at the BSS. In various embodiments, the BSS may allow a maximum of Max-attachers compute instances to be programmatically attached to a given logical volume, where Max-attachers is a tunable setting which may be chosen at the time of the logical volume (in some cases, Max-attachers may be a service-wide parameter applicable to all logical volumes). In some cases in which the logical volume is partitioned across several storage servers, the retention setting (along with the access permission metadata itself) may be sent to individual ones of the storage servers. If and when an event which would otherwise trigger deletion of the metadata occurs and is detected at a given storage server, in some cases a modified version of the metadata may be stored instead of deleting the metadata. For example, within the access permissions record, a special-purpose attachment identifier can be written into an entry for an attached compute instance, which has the effect that the access permissions record is not deleted, and the entry is not re-used for representing newly-attached compute instance. The access permissions record can then continue to be used to check whether submitted I/O commands are to be accepted or rejected, even though an event that would normally (in the absence of the value chosen for the retention setting) have triggered deletion of the access permissions record has already occurred. When making the changes to the access permissions record, the storage server may ensure that the number of compute instances that can be attached to the logical volume concurrently remains at Max-attachers; that is, the use of the special-purpose attachment identifier does not result in a reduction in the total number of compute instances which can be attached. If, at some point, a command to explicitly to reset access permissions for the logical volume is received, or a command to delete the access permissions record is received, the access permissions record can be re-initialized or deleted as requested. The retention setting itself can also be changed based on a received command. In some cases, the BSS may enforce a default retention setting for logical volumes for which explicit retention settings are not received from a customer. Different retention settings can be chosen for respective logical volumes of a given BSS customer or of different BSS customers. For example, for one logical volume, a customer may wish that the access permissions record should be deleted upon the detection of an event of a given type E1, while for another logical volume, the customer may wish that the access permissions record should be retained despite the occurrence of an event of the same type E1.

As one skilled in the art will appreciate in light of this disclosure, certain embodiments may be capable of achieving various advantages, including some or all of the following: (a) ensuring that storage-related access control settings chosen by customers of distributed applications are retained or persisted at a storage service based on input provided by the customers, and (b) ensuring that data objects, stored at the storage service, which can be concurrently accessed from various components of a distributed application, cannot be corrupted despite the occurrence of various types of unplanned events such as termination of execution of some storage clients. Note that although NVMe-compliant reservations and block-oriented storage services are used as examples in this document, the techniques introduced herein are not restricted to any particular way of defining and assigning access permissions to storage objects, or to any particular way of organizing the storage. The techniques described herein can be used with equal success regardless of the access permission scheme used, the manner in which storage is organized at the storage devices used, and the interfaces used to access the storage.

According to some embodiments, a system may include one or more compute instances (CIs) of a VCS of a cloud computing environment or provider network, and one or more storage servers (SSs) of a BSS of the provider network. The CIs may be referred to as storage consumers, as I/O commands directed to the storage servers may be sent from the CIs to the SSs. One of the SSs may store a portion of a first logical volume (LV), a portion of a second LV, a first reservation record (RR) of the first LV, and a second RR of the second LV. The RRs may represent examples of access permissions records: for example, the first RR may indicate access permissions granted with respect to the first LV to one or more CIs that have been configured as registrants with regard to the first LV, and the second RR may indicate access permissions granted with respect to the second LV to one or more CIs. A CI may transmit (e.g., using an API implemented by the BSS), to the SS, a first retention setting (RS) of the first LV. The first RS may indicate that the first RR is to be retained across events, pertaining to the first LV, of a reservation-deletion-triggering event type. Depending on the retention setting in use, such events may at least in some cases be expected to result in the removal or resetting of the access permission metadata pertaining to the corresponding LV. Such events may also be referred to as reservation-deletion-triggering-candidate events or access-permission-record-deletion-triggering-candidate events. Note that in some cases, the first RS may be submitted (e.g., via a web-based console or other control plane interface) by an administrator of the first LV or an administrator of the compute instances using the first LV, and need not be sent by or from a compute instance to the BSS.

A second RS (such as a default RS, according to which events of the reservation-deletion-triggering type are to actually lead to the deletion of the reservation record of the LV), different from the first RS, may be applicable to the second LV. In response to an occurrence of a first event of the reservation-deletion-triggering event type with respect to the second LV, the SS may delete the second RR in accordance with the second RS. Subsequent to deletion of the second RR, an operation indicated in an I/O command directed to the second LV may be performed at the SS without checking access permissions which had been indicated in the second RR. Note that new access permissions may have been set on the LV as a result of other commands, by the time the I/O command is received; if so, such new access permissions may of course be checked prior to the execution of the I/O command.

A second event reservation-deletion-triggering event type, this time pertaining to the first LV, may be detected at the SS. Because of the first RS, the first RR may not be deleted in various embodiments. Instead, in at least some embodiments, a modified version of the first RR may be stored at the SS. When a subsequent I/O command directed to the first LV is obtained at the SS, depending on the specifics of the access permissions indicated in the first RR, in some cases the command may be rejected. In other cases, the command may be accepted and the corresponding I/O operations may be performed at the SS. In either case, the retention of the first RR in accordance with the first RS may result in a different outcome than might have been obtained had the first RS not been received; and similarly, the deletion of the RR of the second LV may not have been performed had the second RS not differed from the first RS.

In at least some embodiments, the access permissions stored in the first and second RRs may be the kinds of access permissions defined in a version of a storage standard specification such as an NVMe specification. In embodiments in which the BSS runs in a cloud provider network, the BSS may implement analogs of various NVMe-defined concepts and related commands—for example, software running at a virtualization host at which a storage client such as a compute instance runs may represent an NVMe controller, and commands to reset an NVMe controller may be supported by the BSS by resetting the state of that portion of the software. Persistent reservations of the type defined in the NVMe specification may be held by or granted to NVMe "hosts", and the attached compute instances (identified by instance-specific host identifiers as discussed below) may be treated as the equivalent of the NVMe "hosts" in various embodiments.

Any of a variety of event types may qualify as reservation-deletion-triggering events in different embodiments; in some embodiments, a command or request indicating the retention setting for an LV's RR may include a list or collection of the specific event types. In one embodiment, a reservation-deletion-triggering event may include a programmatic detachment (i.e., a detachment in response to an invocation of a programmatic interface such as an API), from the LV, of a holder or grantee of an access permission indicated in the RR of the LV. In some embodiments, a reservation-deletion-triggering event may include a planned or unplanned termination of execution (e.g., a shutdown, reboot or restart) of a holder or grantee of an access permission indicated in the RR of the LV, or a loss of electrical power at a holder or grantee of such an access permission. In some cases, a BSS customer may define a custom event type (such as one or more application-level events which can be detected at the SS, or about which messages can be sent to the SS from an application running at a compute instance) across whose occurrences the RRs should be retained. In at least some embodiments, a retention setting may indicate that an RR is to be deleted (not retained) upon a detection of a particular type of event; as such, the RSs may not necessarily be limited to requesting retention of access permissions records, but may instead also or instead indicate conditions under which the access permissions records are to be deleted or reset. In some embodiments, a given RS may indicate multiple types of events: some types of events across which an RR is to be retained, and other types of events whose detection is to lead to deletion of the RR.

In at least some embodiments, the BSS may implement programmatic interfaces which can be used not just to set or provide retention settings for RRs, but also to view or query the currently-applicable RSs for specified RRs. For example, an administrator of an LV may submit a programmatic query pertaining to the RS of the LV, and the BSS may provide the current RS. In some cases, APIs invoked from the attached compute instances may also or instead be used to obtain the current retention settings of an LV.

In some embodiments, an RR for an LV may comprise an array or collection of attacher entries, with individual entries representing (and storing various properties and/or permissions of) respective attached compute instances. Such entries may be referred to as storage consumer entries, as each entry represents one client or consumer of the data stored at the corresponding LV. In some cases, the BSS may support programmatic attachment of at most Max-attacher (where Max-attacher is set to an integer selected at the BSS or requested by a customer) compute instances concurrently to a given LV, so at most Max-attacher such attacher entries may typically be present in the RR. As and when a compute instance which was attached is detached from the LV, the entry which was being used for that compute instance may be freed for re-use, so that the same entry can later be used to represent another compute instance which is programmatically attached to the LV. As such, the storage consumer entries can be referred to as reusable entries. In some cases, as indicated earlier, if the last remaining attached compute instance is detached from the LV, by default this may represent an occurrence of a reservation-deletion-triggering event.

If the retention setting chosen by the customer indicates that the RR is to be retained even if no compute instances remain attached, the storage server may in some embodiments perform the following operations. Instead of including at most Max-attacher attacher entries in the RR, Max-attacher+1 entries may be included. When a reservation-deletion-triggering event occurs, one of the entries may be modified, e.g., by storing a special-purpose constant within it, to indicate that the RR is being retained in accordance with the RS despite the occurrence of the event. The modification may indicate that the attacher entry is not to be overwritten or re-used, e.g., in response to a subsequent attachment of another CI to the LV. By adding the extra entry in the array or collection of attacher entries, the BSS may ensure that Max-attacher attachments can continue to be supported for the LV, while still indicating that the retention setting has been changed based on customer or client input.

In at least one embodiment, each attacher entry may include a respective host identifier (HostID) field and a respective attachment identifier (AttachmentID) field. The HostID may include a value sent from the attached compute instance via (for example) a command referred to as a SetHostID command (which is used by the compute instance to identify itself to the BSS, but may not necessarily represent the virtualization host at which the compute instance is run), while the attachment ID may include a string value generated at the BSS or the VCS to represent the successful programmatic attachment of the compute instance. In some embodiments, the modification made by the SS to an attacher entry in response to the occurrence of the event may include storing a special-purpose value in the AttachmentID field, while the HostID field may be left unchanged. The special-purpose value, which may indicate the retention setting chosen by the client, may be referred to as a "phantom" AttachmentID, as it may typically not be selected from a range of values which are used as actual attachment IDs. In at least some embodiments, if a command to set a HostID for a particular attached compute instance is not submitted, the BSS may choose and set a HostID (e.g., a special HostID referred to as a Unique HostID) for that compute instance.

In some embodiments, after the phantom Attachment ID has been stored in one of the attacher entries (e.g., the entry which was being used to represent the last remaining attached CI), that entry may not be re-used for another attachment until one or more commands are received from other CIs or from the customer. In one embodiment, if a SetHostID command supported by the BSS is received, with the same HostID as the HostID in the entry with the phantom Attachment ID, this may lead to the removal of the phantom Attachment ID and the freeing of the entry for re-use. In another embodiment, the entry may be made available for re-use (e.g., by clearing or deleting the phantom Attachment ID) in response to an explicit command to reset or release the reservation or access permissions of the LV. An explicit command to delete the RR may cause the removal of the RR in various embodiments, regardless of the retention setting. In some embodiments, instead of using special-purpose attachment identifiers, the RR may be marked or modified in other ways which indicate that the RR is being retained in accordance with a customer-specified retention setting. In one embodiment, the RR may not be modified in any unusual way (e.g., using a special-purpose attachment identifier) when a triggering event of the kind indicated above occurs; instead, for example, a separate data structure may be maintained at the storage server or the BSS, comprising respective pointers to the RRs which are being retained based on the retention settings, and providing an indication of the access permissions which were in place at each of the RRs prior to the corresponding triggering event.

In at least one embodiment, at least a portion of a storage object (such as a logical volume accessible via a block-level programmatic interface), and a permissions record of the storage object (similar to a reservation record), may be stored at a storage server. The permissions record may indicate that one or more storage consumers are prohibited from performing a type of I/O operation on the storage object. For example, the permissions record may indicate that only a particular storage consumer (such as a particular compute instance which is programmatically attached to the storage object) is permitted to perform write I/Os to the storage object, thereby indicating that no other storage consumer can perform write I/Os. In response to a detection of an event of a deletion triggering event type (such as the programmatic detachment of the last-remaining attached storage consumer), a modified version of the permissions record may be stored at the storage server in some embodiments. The modified version may also indicate that the one or more storage consumers remain prohibited from performing the type of I/O operation. In some embodiments, the original version of the permissions record may be modified, e.g., using a phantom Attachment Identifier) to indicate that the permissions record is being retained in accordance with a retention setting received for the permissions record. After the modified version has been stored, a command to perform a particular I/O operation directed to the storage object may be received at the storage server. Such a command may be processed based at least in part on the modified version of the permissions record. For example, if it is a command to perform a write operation, and write operations are prohibited by the modified version, the command may be rejected in various embodiments.

According to some embodiments, a system may include a set of storage devices of a BSS which collectively host or store a block storage volume, at least one compute server (such as a VCS virtualization host) hosting multiple virtual machine instances which are simultaneously attached to the block storage volume, and a reservation manager. The set of storage devices may for example be distributed among two or more storage servers of the BSS, with a respective replica of the volume contents being stored at respective separate storage servers for fault tolerance. The volume may also be divided into one or more partitions in some embodiments, with the respective partitions being striped or placed across multiple storage devices or drives, or erasure encoded across a group of drives. The reservation manager, which may comprise executable instructions run at a storage server, may be configured to store respective reservations of the logical volume for the virtual machine instances, e.g., in respective slots in a reservation table or access permissions record. The reservations may manage read and write access from the virtual machines instances to the block storage volume. The reservation manager may remove a reservation from the reservation table upon detachment of the corresponding virtual machine instance from the block storage volume. In various embodiments, even when all of the virtual machine instances have detached from the block storage volume, the reservation manager may maintain a reservation slot for a storage controller in the reservation table, wherein maintaining the reservation slot for the storage controller prevents releasing a namespace used for managing the read and write access. In some embodiments, as described below, a special purpose value or identifier may be stored in the slot that is maintained after all the virtual machine instances have detached. The reservation manager may eventually release the namespace (e.g., reset or delete the reservation on the namespace) in response to a particular command received from an attached virtual machine instance, such as a preempt-and-abort command. In various embodiments, the reservation manager may comprise logic residing on or implemented at a BSS storage server. By implementing the technique described above (of retaining the namespace reservation) the reservation manager may beneficially offer namespace fencing protection using minimal additional resources. For example, only a small amount of storage for the maintained slot may be needed in addition to the resources used for executing the reservation manager, and no new network traffic or API calls may be required.

In some embodiments, a computer-implemented method may comprise storing, in a reservation table (also referred to as an access permissions record or APR), respective reservations for each of multiple virtual machine instances (e.g., VCS computer instances) attached to a shared volume. The reservations may be used to manage read and write access from the virtual machines instances to the shared volume. A reservation may be removed or cleared from the reservation table upon detachment of the corresponding virtual machine instance from the shared volume in some embodiments. Even when all the virtual machine instances have been detached from the shared volume, a reservation slot for a storage controller may be retained in the reservation table. Maintaining the reservation slot may prevent releasing a namespace (e.g., resetting or clearing the reservation on the namespace or associated with the shared volume) used for managing the read and write access in various embodiments. In at least some embodiments, the computer-implemented method may include releasing the namespace upon receiving a particular command, such as a preempt-and-abort command. In various embodiments, a virtual machine instance may be detached from the shared volume when the virtual machine instance terminates execution or becomes unreachable over a network connecting the virtual machine instance to the shared volume. The virtual machine instance may be re-attached to the shared volume when the virtual machine instances relaunches or becomes reachable over the network.

Although the techniques introduced herein for retaining or persisting permissions information are presented primarily in the content of managing access to storage objects such as block storage volumes, a similar approach may be used in domains other than storage in some embodiments. For example, in some embodiments networking configuration settings stored in files or data structures, or access to a specific computing device (such as a special-purpose supercomputer or cluster) may be managed using permissions records similar to the APRs or reservation records described herein. A retention setting for such a permissions record (which governs access to resources other than storage objects per se) may be received via programmatic interfaces in such an embodiment, indicating that the permissions record is to be retained in the event of an event that would otherwise lead to the removal of the permissions record. Such events may include, for example, programmatic disassociation of users or other entities from the objects or devices whose access permissions are stored in the configuration settings. If and when such an event is detected, the permissions record may be retained, e.g., in a modified form or in its original form, and the retained version may be used to manage access to the resources/objects/devices even after the event occurs. If the pre-event version of the permissions record prohibited some types of operations by one or more accessors of the object or resource for which the permissions record was created, those types of operations may continue to be prohibited to those accessors. Subsequently, if an explicit request to delete the permissions record is received, the permissions record may be deleted, and the permissions which were stored in the record may no longer apply.

FIG. 1 illustrates an example system environment in which a block storage service may enforce client-specified retention settings for access permissions records pertaining to logical volumes that may be accessed from multiple compute instances, according to at least some embodiments. As shown, system 100 includes resources and artifacts of two network-accessible services of a cloud provider network: a BSS 102 and a VCS 103. The BSS may include a collection of storage servers (SSs), such as SS 105A and 105B. A given SS may include a set of processors, a memory and one or more sets of storage devices. The VCS may include a collection of virtualization hosts (VHs), such as VH 125A and VH 125B, each of which may also include a set of processors, a memory and one or more storage devices. Compute instances or virtual machines may be launched at the VHs on behalf of clients of the VCS with the help of virtualization management components (VMCs) such as VMCs 146A or VMCs 146B in the depicted embodiment. For example, compute instance (CI) 140A may be set up at VH 125A, while CI 140B and CI 140C may be launched at VH 125B. A given compute instance may include one or more application programs (such as programs which access data stored at logical volumes managed by the BSS) and an operating system. For example, CI 140A may include storage accessing program (SAP) 144A and an operating system (OS) 142A, CI 140B may include SAP 144B and OS 142B, while CI 140C may include SAP 144C and OS 142C.

Storage needs of application programs and/or operating systems of the CIs may be satisfied using a variety of techniques in different embodiments, including programmatically attachment of the CIs to logical volumes whose partitions are stored at the SSs of the BSS. A logical volume may be created at the request of a client of the VCS, and attached to one or more of the client's CIs, in response to one or more programmatic requests directed to the VCS in some embodiments. In other embodiments, at least one logical volume may be created and automatically attached to a given compute instance by the VCS control plane at the time that the compute instance is launched. In the example scenario shown in FIG. 1, a logical volume 160, divided into N partitions, has been set up at the BSS. Logical volume data partition (LVDP) 0 176A of the volume is stored at the storage devices of SS 105A, while LVDP N 176B is stored at the storage devices of SS 105B. Note that while a partition of only a single logical volume 160 is illustrated at each SS of FIG. 1, in at least some embodiments a given SS may store one or more partitions of one or more logical volumes.

An access permissions record (APR) created for logical volume 160 may indicate the read and/or write permissions granted with respect to the logical volume to storage consumers such as compute instances running at virtualization hosts of the VCS in the depicted embodiment. The access permissions stored in the APR may be specified in accordance with persistent reservations defined in a storage-related standard similar to NVMe, and the APR may therefore be referred as a reservation record in the depicted embodiment. A respective version or copy of the APR of logical volume 160, such as APR 155A or APR 155B, may be stored at each of the SSs 105 at which partitions of the volume are stored in the depicted embodiment. Note that when changes are made to the access permissions, e.g., in response to commands issued from the compute instances or commands submitted by administrators, the versions of the APR at the different SSs may temporarily differ in some embodiments, with the changes being applied first at a selected SS. However, over time, the versions of the APR may be synchronized with one another in various embodiments, e.g., in accordance with a fault-tolerant APR state propagation protocol implemented by the compute instances and the storage servers. A respective APR manager (such as APR manager 188A or APR manager 188B) may run at each storage server in the depicted embodiment. The APR managers may be responsible for managing access control metadata including APRs and RSs. APR managers may also be referred to as reservation managers.

Programmatic attachment 162A enables I/O commands (such as reads and writes) to be directed to any of the LVDPs of logical volume 160 from CI 140C via a network 150, while programmatic attachment 162B enables I/O commands to be directed to the LVDPs from CI 140A via the network. In at least some embodiments, the VMCs of a VH may include respective block storage virtualization managers (BSVMs), such as BSVM 148A at VH 125A and BSVM 148B at VH 125B, that act as intermediaries between the compute instances at those VHs and the BSS. For example, I/O commands directed to logical volume data, reservation record access or mutation commands, and the like that originate at the CIs may be intercepted at the BSVMs, transformed if needed, and sent on to the SSs by the BSVMs. Responses to the commands may be received from the BSS at the BSVMs and forwarded to the CIs. In at least one embodiment, VMCs such as BSVMs may also be responsible for establishing network connections on behalf of the compute instances—e.g., when a compute instance is attached to a logical volume (or when a compute instance attempts to re-establish connectivity with a logical volume), respective network connections may be set up by the VMCs between the CI and each of the SSs at which a partition of that logical volume is stored. The VMCs may in effect act as agents of the CIs with regard to I/O operations and APR-related operations associated with the attached logical volumes. The CIs may be referred to as storage clients or storage consumers in the depicted embodiment. In some implementations, one or more client-side components of the BSS (components which communicate with the BSS servers for storage I/O related tasks) may run at individual ones of the CIs or VHs; a BSVM may be considered one such client-side component.

The access permissions that are to be granted with respect to logical volume 160 to different compute instances may be specified (and if desired, modified) via application programming interfaces (APIs) supported by the BSS in some embodiments. Such APIs may be invoked, for example, from the attached CIs and/or by administrators (e.g., the customers of the VCS on whose behalf the CIs and logical volumes are set up) using web-based consoles.

In the embodiment shown in FIG. 1, APR retention settings (RSs) for the APRs of logical volume 160 may be indicated in commands or requests submitted from the CIs 140 to the SSs 105. At each SS at which a partition of the logical volume and its APR is stored, a local copy of the RS may also be stored—for example, RS 156A may be stored at SS 105A, while RS 156B may be stored at SS 105B. An RS may indicate the desired persistence or retention characteristics of the APR—e.g., an RS may indicate that the APR is to be retained across occurrences of events of one or more classes that may otherwise result in the removal of the APRs. These classes of events may be referred to as reservation-deletion-triggering event types. Such event types may include, for example, programmatic detachment of all CIs from the logical volume, shutdown or restarts of all attached compute instances, and so on. An RS may in some cases indicate that an APR should be deleted or removed if an event of a specified class occurs with respect to the logical volume. If and when an RS is changed via a programmatic command or request, the changes may be propagated among the SSs storing the partitions of the logical volume, e.g., using the same type of protocol which is used to propagate changes to the APRs themselves in some embodiments. In some embodiments, the BSS may provide customers a default list of event types which are reservation-deletion-triggering events, e.g., via programmatic interfaces or via BSS documentation.

Note that even though respective copies/versions of the APRs and RSs are shown at respective SSs in FIG. 1, in various embodiments an RS may apply to all copies/versions of the APRs. The partitions of the logical volume may be constructs that are created internally at the BSS in various embodiments, e.g., for performance reasons and/or to accommodate logical volumes of very large sizes; the customers of the BSS and applications such as the SAPs may not be aware of the existence of the partitions in such embodiments. I/O commands submitted from the compute instances on behalf of the SAPs or operating systems may be directed to offsets within the logical volume as a whole, and translated into partition-level commands at the client-side components in some embodiments.

Consider a scenario in which, based on a command received from CI 140A, RS 156 indicates that APR 155 is to be retained if events of a particular type ET1 occur. As I/O commands directed to the logical volume (i.e., to LVDP 176A) are received at SS 105A from attached CIs 140, the access permissions stored in the APR may be checked to determine whether the reads/write are permitted or not. Based on the current contents of the APR, some I/O commands may be rejected, while others may be accepted and the corresponding reads and writes may be performed. If/when an event of type ET1 is detected at SS 105A, a modified version of APR 155A may be stored at the SS 105A, e.g., instead of deleting the APR. The modified version may indicate, e.g., via a special-purpose value such as a phantom attachment identifier stored in an entry for an attached CI, that the APR is being retained in accordance with the RS, and is not to be deleted until an explicit command to do so is received. Subsequent I/O commands received at SS 105A may also be processed using information contained in the (now-modified) APR, with some commands potentially being rejected and others being accepted. In contrast, had the RS 156 not been changed to indicate that the APR 155 is to be retained across events of type ET1, the APR may have been deleted when the event occurred. For subsequent I/O commands in this scenario, the permissions which were indicated in the APR 155 prior to the event would no longer be used to check whether the command is permitted or not. Of course, a compute instance could cause a new APR to be created and used after the deletion, but this may still leave a window of time within which at least in principle, I/O commands would have to be processed without an applicable APR. BSS support for RSs may ensure that BSS customers have the ability to avoid such potentially problematic scenarios in the depicted embodiment.

In some embodiments, as mentioned earlier, access permissions for logical volumes of a BSS may be based on reservation types defined in a storage-related standard such as a version of NVMe. FIG. 2 illustrates examples of reservation types which may be supported for controlling accesses from client compute instances to logical volumes of a block storage service, according to at least some embodiments. The reservation types and associated entities (e.g., reservation holders, registrants, and non-registrants) and semantics (i.e., the kinds of operations that can be performed by a holder, registrant or non-registrant) shown in Table 200 of FIG. 2 are defined in the NVMe 1.4 specification. In the specification, six types of reservations for NVMe-based storage devices are defined as shown in the table: Write Exclusive, Exclusive Access, Write Exclusive-Registrants Only, Exclusive Access-Registrants Only, Write Exclusive-All Registrants, and Exclusive Access-All Registrants. The number of reservation holders, and the types of operations permitted (with Y indicating permitted operations, and N indicating prohibited operations) in each reservation type, are indicated in Table 200.

In various embodiments, reservation types similar (but not necessarily identical) to those shown in FIG. 2 may be supported for logical volumes (or for individual partitions of logical volumes) by a BSS similar in features and functionality to BSS 102 of FIG. 1. Such support may be provided regardless of the type of storage devices on which the data of the logical volumes is stored—e.g., the support for reservations may not necessarily be tied to the storage technology used at the BSS. The reservation holders, registrants and non-registrants may be compute instances that are programmatically attached to the logical volumes in at least some embodiments. The reservation type that is used for a given logical volume may be selected based on invocations of BSS APIs from the compute instances, and/or based on input received via programmatic interfaces at the BSS control plane from administrators of the logical volumes or compute instances.

Figure 3:
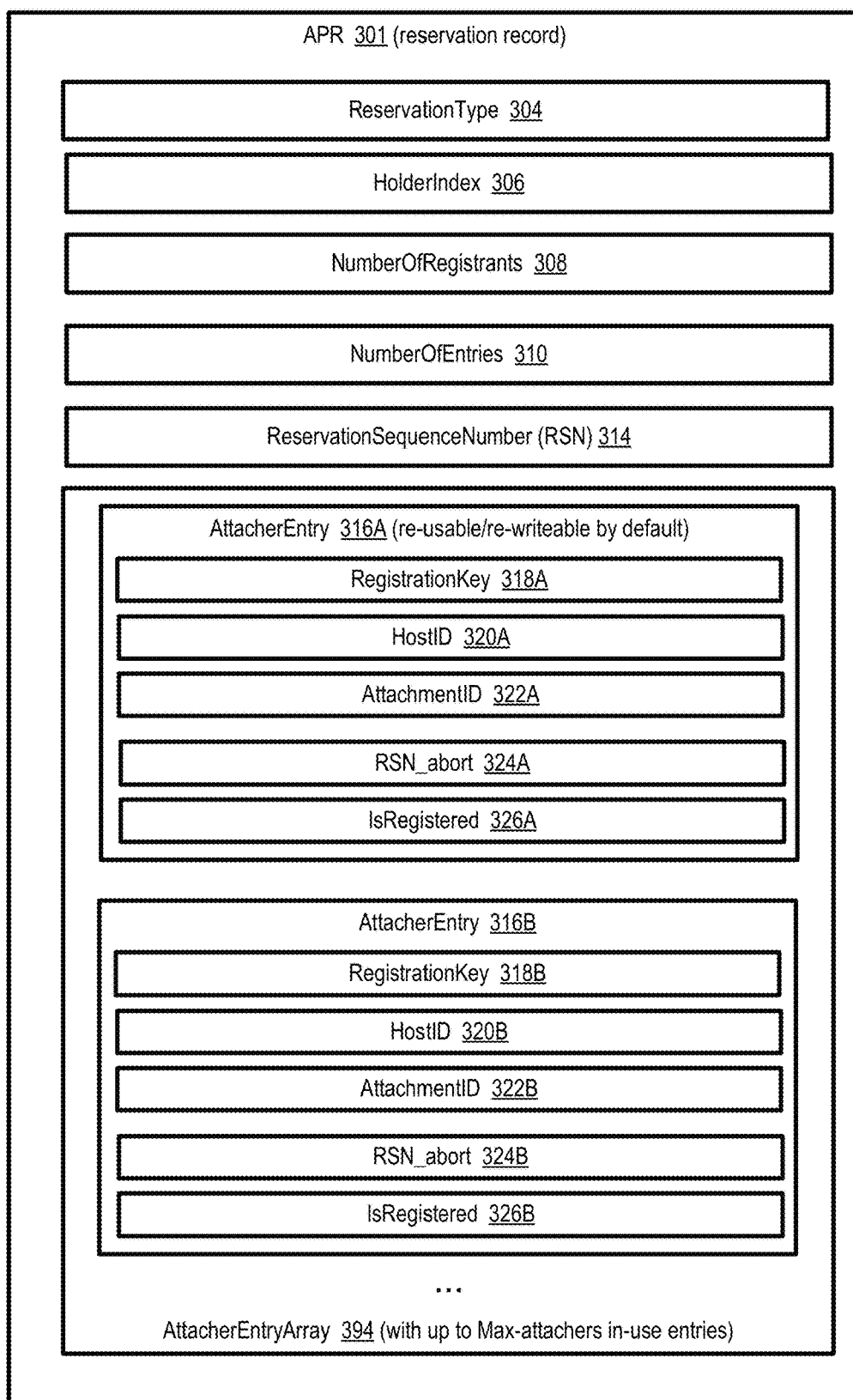
FIG. 3 illustrates example contents of access permissions records which may be maintained at a block storage service, according to at least some embodiments.

FIG. 3 illustrates example contents of access permissions records which may be maintained at a block storage service, according to at least some embodiments. The access permissions supported by the BSS may be specified using reservation types similar to those defined in NVMe specifications. In the depicted embodiment, for a given shared logical volume of the BSS, an access permissions record or APR 301 may include a ReservationType field 304 indicating the type of reservation (e.g., one of the reservation types shown in FIG. 2) that is being used. At a given point in time, there may be zero or more compute instances that are programmatically attached to the logical volume, and the APR may include an AttacherEntryArray 394 with respective entries (such as AttacherEntry 316A, AttacherEntry 316B, etc.) representing the attached compute instances. The APR may be referred to as a reservation table in various embodiments, and the entries within the AttacherEntry Array may be referred to as respective slots. In at least some embodiments, the BSS may impose a limit on the maximum number of compute instances which can be attached concurrently to a given logical volume. Attacher entries may also be referred to as attacher slots or registrant slots in various embodiments. Note that data structures other than arrays may be used for attacher entries in some embodiments.

If the reservation type being used requires a single reservation holder to be specified, the HolderIndex field 306 may be used to indicate the index of the reservation holder compute instance within the AttacherEntry Array in the depicted embodiment. Not all the attached compute instances may have been registered (e.g., via invocation of registration APIs) with respect to the reservation for a given logical volume in some embodiments; the NumberOfRegistrants field 308 may indicate how many of the attached compute instances are registered. The NumberOfEntries 310 may indicate the total number of compute instances that are currently attached. A monotonically increasing integer referred to as a ReservationSequenceNumber (RSN) may be incremented each time the APR is updated (e.g., at a particular storage server which is currently designated as the coordinator for changes to the APR of the logical volume) in the depicted embodiment. An attached compute instance may store an RSN indicating the most recent APR updates of which the compute instance is aware in various embodiments, and include that RSN within I/O commands sent to the storage servers at which the partitions of the logical volume are stored. If a compute instance is informed (e.g., by a storage server to which an I/O request is sent from the compute instance) that the RSN known at the compute instance is stale (i.e., that a newer RSN value has been set by the coordinator storage server), the compute instance may communicate with the coordinator storage server to obtain the latest version of the APR and the corresponding RSN in various embodiments.

A given entry 316 in the AttacherEntryArray 394 may store various metadata elements pertaining to an attached compute instance. These elements may include a unique key (e.g., RegistrationKey 318A or 318B) supplied on behalf of the compute instance to the BSS at the time that a request or command to register the compute instance is submitted, an identifier chosen as a host identifier for the compute instance (e.g., HostID 320A or 320B), an identifier of the attachment (e.g., AttachmentID 322A or 322B), and a Boolean value (e.g., IsRegistered 326A or 326B) indicating whether the compute instance represented by the entry is currently registered or not with respect to the logical volume. The HostID fields may be used in some embodiments to comply with storage standards (such as various NVMe standards) which require such terminology for identifying sources of I/O commands and reservation-related commands; however, the HostID fields in the AttacherEntry fields need not necessarily be related to identifiers of virtualization hosts at which the corresponding attached compute instances run. In some implementations, a HostID field may serve in effect as an identifier (which may be selected at the corresponding attached compute instance) of the compute instance rather than as an identifier of a virtualization host. In at least some embodiments, an integer referred to as RSN_abort (e.g., RSN_abort 324A or RSN_abort 324B) may also be stored for each attached compute instance in the attacher entry. The RSN_abort field may be used to implement compute instance access abort functionality (i.e., functionality which enables the prevention of subsequent I/O operations issued from a given compute instance by revoking permissions which were granted to that compute instance). The value of RSN_abort for a given compute instance may indicate an RSN value after which the permissions granted to the compute instance are revoked. For example, if the RSN_abort for a given compute instance CI1 is set to Y, this may be interpreted at a storage server SS1 of the BSS to mean that any I/Os directed from CI1 to the logical volume partition LVDP1 hosted at SS1 are to be aborted if the RSN stored at SS1 is greater than Y. In some embodiments, SS1 may drain in-flight I/Os for LVDP1 prior to committing an APR change that includes a change to RSN_abort.

In various embodiments, some of the fields of an APR 301 may be modifiable based on commands issued from compute instances or administrators, while others may in some cases not be modifiable. In at least one embodiment, an APR 301 may also indicate which, if any, of the attached compute instances is permitted to mutate the APR itself, and/or to set/or modify retention settings on the APR. Information about permission to mutate the APR may be indicated within the attacher entries in one implementation, and may be encoded within the ReservationType field 304 in other implementations. In some embodiments, if an attached compute instance is permitted to write to a logical volume partition based on the reservation type, that compute instance may also be permitted to update the APR.

In some embodiments, attacher entries may be re-used as and when compute instances are detached from the logical volume and other compute instances are attached. For example, unless the detachment is an example of an event type for which retention setting is specified, when a compute instance with attachment ID 322A is detached, the entries in fields 318A, 320A, 322A, 324A and 326A may all be reset (e.g., to null strings or zeros) in such embodiments. This action may also be referred to as "removing" or clearing the reservation slot which was being used for the compute instance. By default, in some embodiments, if all the attacher entries are reset, and there is no compute instance that is left attached, the APR may be deleted after the detachment of the last-remaining attached compute instance (which may have held a reservation on the logical volume). To prevent such APR deletions, retention settings may be used in various embodiments as described below in further detail. In some implementations, instead of simply resetting or clearing the corresponding entry when the compute instance detaches, the entry may be deleted. In various embodiments, a compute instance may be detached from a logical volume in several ways—e.g., in response to a programmatic detach command, or when the BSS (e.g., a reservation manager of the BSS) detects that the compute instance has terminated execution or lost network connectivity to the BSS. In at least some embodiments, if the detachment is triggered by a termination or network disconnection event, the compute instance may be automatically re-attached when it re-launches or regains connectivity to the BSS storage servers it was using.

Figure 4:
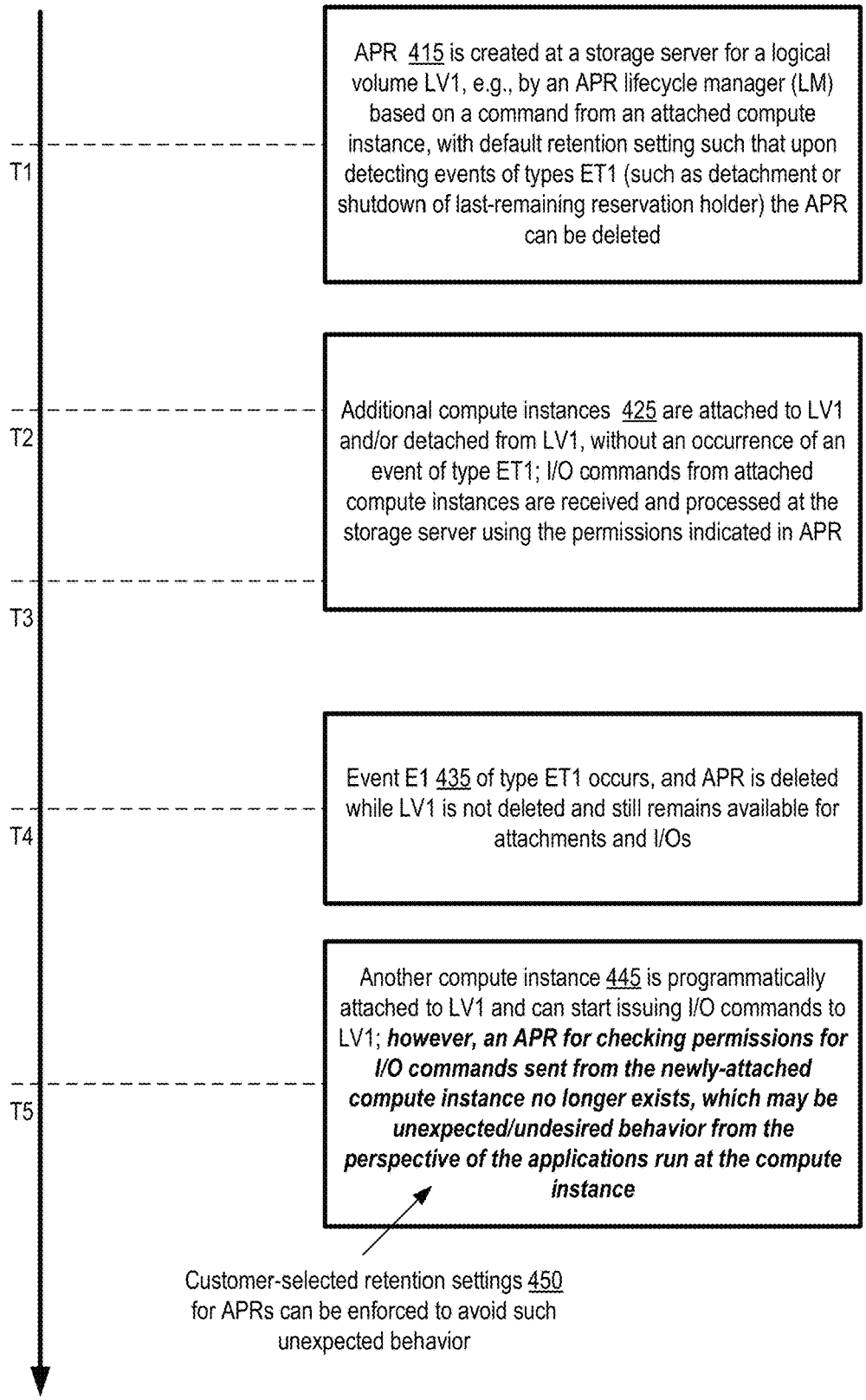
FIG. 4 illustrates an example timeline of events during which an access permissions record of a logical volume may be deleted while the logical volume remains available for input/output operations, according to at least some embodiments.

FIG. 4 illustrates an example timeline of events during which an access permissions record of a logical volume may be deleted while the logical volume remains available for input/output operations, according to at least some embodiments. At time T1 along timeline 400, an access permissions record APR 415 may be created in the depicted embodiment for a logical volume LV1. The APR may be initialized, for example, by an APR lifecycle manager comprising one or more threads or processes running at an SS of a BSS, based on a command submitted from an attached compute instance. By default, the retention setting of the APR may be such that upon a detection of events of a type ET1 (such as a detachment or shutdown of the last-remaining reservation holder compute instance), the APR can be deleted by the lifecycle manager.

Between times T2 and T3, additional compute instances 425 may be attached to LV1 and/or detached from LV1 in the example scenario shown in FIG. 4, without an occurrence of an event of type ET1. I/O commands from the attached compute instances may be received and processed at the storage server using the permissions indicated in the APR. Note that the APR itself may be modified over this time period in response to APR mutation commands received from the attached compute instances.

At time T4, an event E1 435 of type ET1 may occur and be detected at the storage server. Based on the default retention setting, the APR may be deleted. The logical volume LV1 may remain (i.e., may not be deleted) and be available for attachments with other compute instances and for processing I/O commands from such compute instances. In some cases, depending on the definition of the event types ET1, one or more compute instances may remain attached to LV1 despite the occurrence of the event E1. In at least some embodiments, a logical volume may not be deleted at a BSS unless and until an explicit command to delete it is received from a customer.

At time T5, another compute instance 445 may be programmatically attached to LV1 and may start issuing I/O commands to LV1. However, at this stage an APR for checking permissions with regard to such I/O commands no longer exists. This may represent unexpected/undesired behavior from the perspective of the storage-accessing applications being run at the compute instances which utilize LV1. Customer-selected retention settings 450 may be enforced in various embodiments to avoid such unexpected or undesired behaviors.

FIG. 5 illustrates examples of event types which may, by default, trigger deletion of access permissions records of logical volumes, according to at least some embodiments.

The programmatic detachment of the last-remaining attached reservation holder 515 represents one such event type. For example, consider the following sequence of events with regard to a logical volume LV1 whose sole partition is stored at a storage server SS1 of a BSS: a reservation record or similar APR is created for LV1 in response to a programmatic request, and two compute instances CI1 and CI2 are attached. CI is designated as a reservation holder. Later, another compute instance CI3 is attached and the reservation record is modified such that CI2 and CI3 are both reservation holders. CI1 is detached, and then CI3 is detached. If and when CI2 is also detached, there is no remaining reservation holder, so the APR may be deleted if the default retention settings are used. In some embodiments, the detachment of the last remaining attached compute instance (regardless of whether it is the holder of a reservation or not) may trigger a deletion of the reservation record.

Shutdowns/terminations/restarts of the last-remaining reservation holder 525 may also trigger the deletion of access permissions records in some embodiments by default. In some embodiments, last-remaining reservation holder compute instance detachments, shutdowns, termination of executions, reboots and the like may be considered analogs in the cloud environment of "power loss" events at non-cloud environments as defined in some storage technology standard specifications similar to NVMe. Such specifications may allow the removal of reservation records (APRs) upon "power loss", depending on the retention settings chosen by the administrators of the storage systems, so the BSS may treat the cloud analogs of the "power-loss" events similarly. In some cases, actual power loss events, e.g., at the virtualization host at which the last-remaining reservation holder compute instance was running, or at the storage server at which a single-partition logical volume is stored, may trigger the deletion of the corresponding APR.

In at least one embodiment, the BSS may enable customers or clients to define events which are to trigger removal of APRs by default. Such customer-defined events 545 may, for example, comprise a detection at the BSS that no I/O commands have been directed to the logical volume for a long period (e.g., D days or W weeks), or that the number of I/O commands from a reservation holder within a particular time period has exceeded a threshold, and so on. In some embodiments, other types of events than those shown in FIG. 5 may lead to the deletion of APRs such as reservation records by default.

Figure 6:
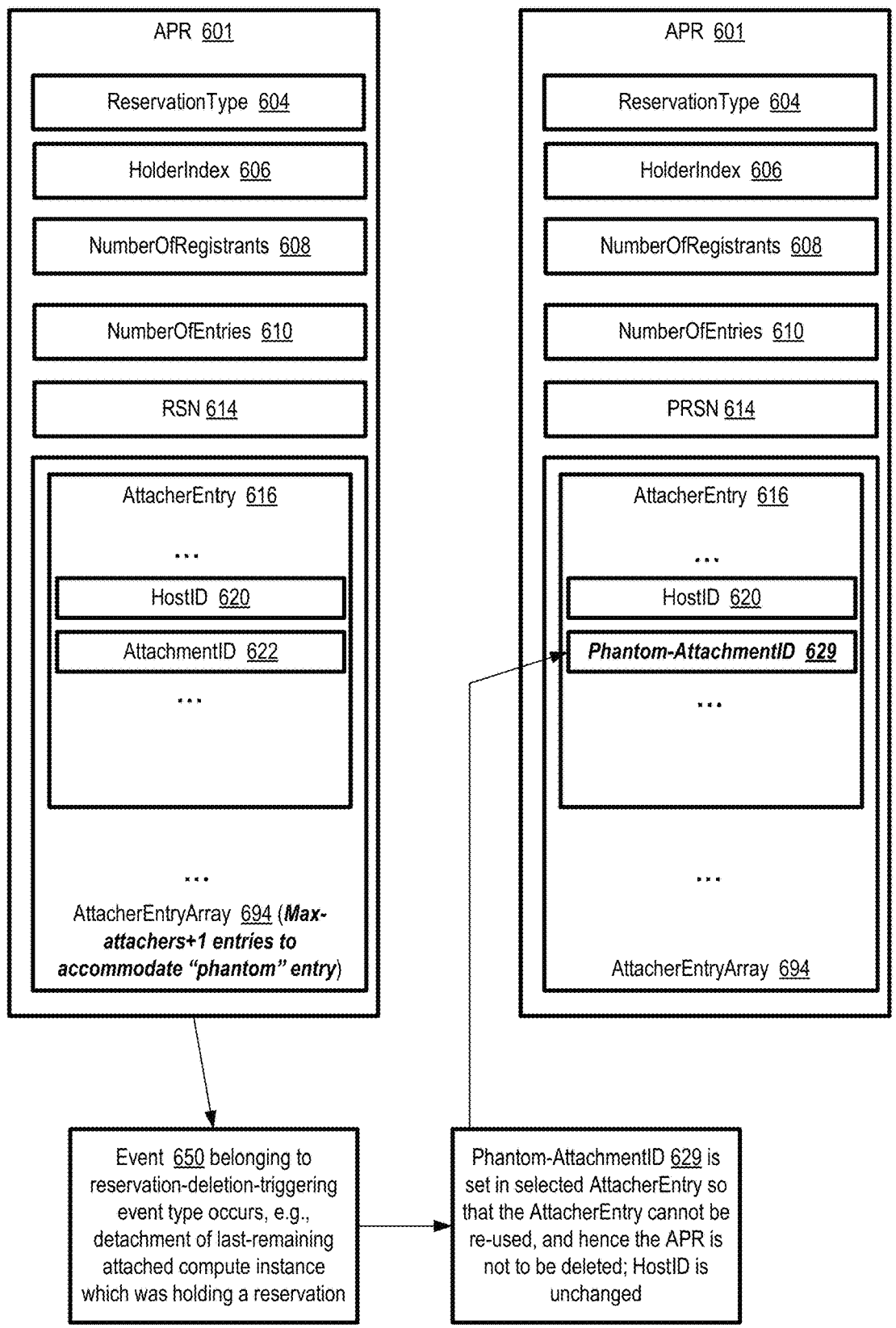
FIG. 6 illustrates an example use of special-purpose attachment identifiers to help enforce retention settings of access permissions records of logical volumes, according to at least some embodiments.

FIG. 6 illustrates an example use of special-purpose attachment identifiers to help enforce retention settings of access permissions records of logical volumes, according to at least some embodiments. An APR 601 of a logical volume of a BSS which supports logical volume reservations of the kind discussed earlier may include a ReservationType field 604, a HolderIndex 606, a NumberOfRegistrants field 608, a NumberOfEntries field 610, a reservation sequence number (RSN) field 614, and an AttacherEntryArray 694, similar to the fields of APR 301 shown in FIG. 3. A maximum of Max-attachers attached compute instances may be supported for a given logical volume by the BSS in the embodiment of FIG. 6. However, to help enforce retention settings of the kind introduced above, the AttacherEntryArray may include Max-attachers+1 entries, with one "spare" entry whose contents are changed as follows when an APR or reservation deletion triggering event occurs. This extra entry may be used for at least several purposes in some embodiments: (a) to store an indication that the retention entry is in use and should not be deleted (b) to ensure that the reservation type that was in use prior to the deletion triggering event continues to be used despite the deletion triggering event and/or (c) to also allow up to Max-attachers attachments to be supported while the APR is being retained after a deletion triggering event.

Assume that a reservation deletion-triggering event 650, which is a programmatic detachment of the last-remaining attached compute instance which holds a reservation in accordance with the ReservationType stored in field 604, occurs, and that the retention setting requires the APR to be retained despite the occurrence of the event. At this point, the HolderIndex 606 points to AttacherEntry 616, the HostID 620 is an identifier which was chosen (e.g., at the compute instance itself) for the last-remaining attached compute instance, and the AttachmentID 622 is an identifier which was generated by the BSS or the VCS from an acceptable range of valid attachment identifiers.

In the embodiment depicted in FIG. 6, a special-purpose value, referred to as Phantom-AttachmentID 629, may be stored within the AttachmentID field of the AttacherEntry 616 upon the detection at a BSS storage server of the deletion-triggering event. The HostID field may be left unchanged. Phantom-AttachmentID may be a value which does not belong to the acceptable range of valid attachment identifiers in at least some implementations. In effect, the use of such an out-of-valid range attachment identifiers may signal that the AttacherEntry 616 is being retained in accordance with the retention setting, despite the occurrence of the event which would otherwise have led to the deletion of the APR. Whereas by default, the detachment of a compute instance from the logical volume would lead to the freeing up (and later potential re-use) of the corresponding attacher entry by resetting the AttachmentID field, the use of the Phantom-AttachmentID may also be interpreted at the storage server to mean that (as long as the Phantom-AttachmentID is not cleared as a result of a subsequent command) AttacherEntry 616 is not to be re-used. However, because there are still Max-attachers other entries available, Max-attachers compute instances may still be attached to the logical volume, thereby avoiding a violation of the rule that permits up to Max-attachers attachments. The change of the AttachmentID field to Phantom-AttachmentID may be treated as the logical equivalent of a reservation modification command received at the storage server (even though no such command was actually issued) in various embodiments. In embodiments in which the APR is replicated at several storage servers (such as a primary and a non-primary), the change to APR1 may be propagated to all the storage servers, just as changes made in response to issued commands would be propagated. Furthermore, in at least some embodiments in which respective primary storage servers are used to store each of several partitions of a logical volume for which APR1 is being used, the changed version of APR1 may be propagated among all such primary storage servers using a fault-tolerant APR propagation protocol of the kind described below.

The operations illustrated in FIG. 6 may ensure that after the deletion-triggering event occurs and the Phantom-AttachmentID is stored in the APR in the depicted embodiment, I/O commands directed to the logical volume are treated as though the last-remaining reservation holder had not been detached. For example, the HostID field (which was not changed after the occurrence of the event) may still in effect indicate that that last-remaining reservation holder compute instance still holds the reservation, so some newly-submitted I/O commands may be rejected if they conflict with that reservation. At some point, a command whose fulfillment requires the re-setting of the Phantom-AttachmentID may be received at the storage server, and the Phantom-AttachmentID may be reset (e.g., to 0 or null) accordingly, thereby freeing up the AttacherEntry for potential re-use; note, however, that no more than Max-attachers attachments may be permitted in various embodiments regardless of whether the extra entry has the Phantom-AttachmentID within it or not. In some embodiments, in addition to or instead of using a Phantom-AttachmentID as shown in FIG. 6, a different field of the APR (such as a RetainedDueToRetentionSetting field outside the AttacherEntry Array) may be used to indicate that the APR is being retained despite the occurrence of the deletion-triggering event.

Figure 7:
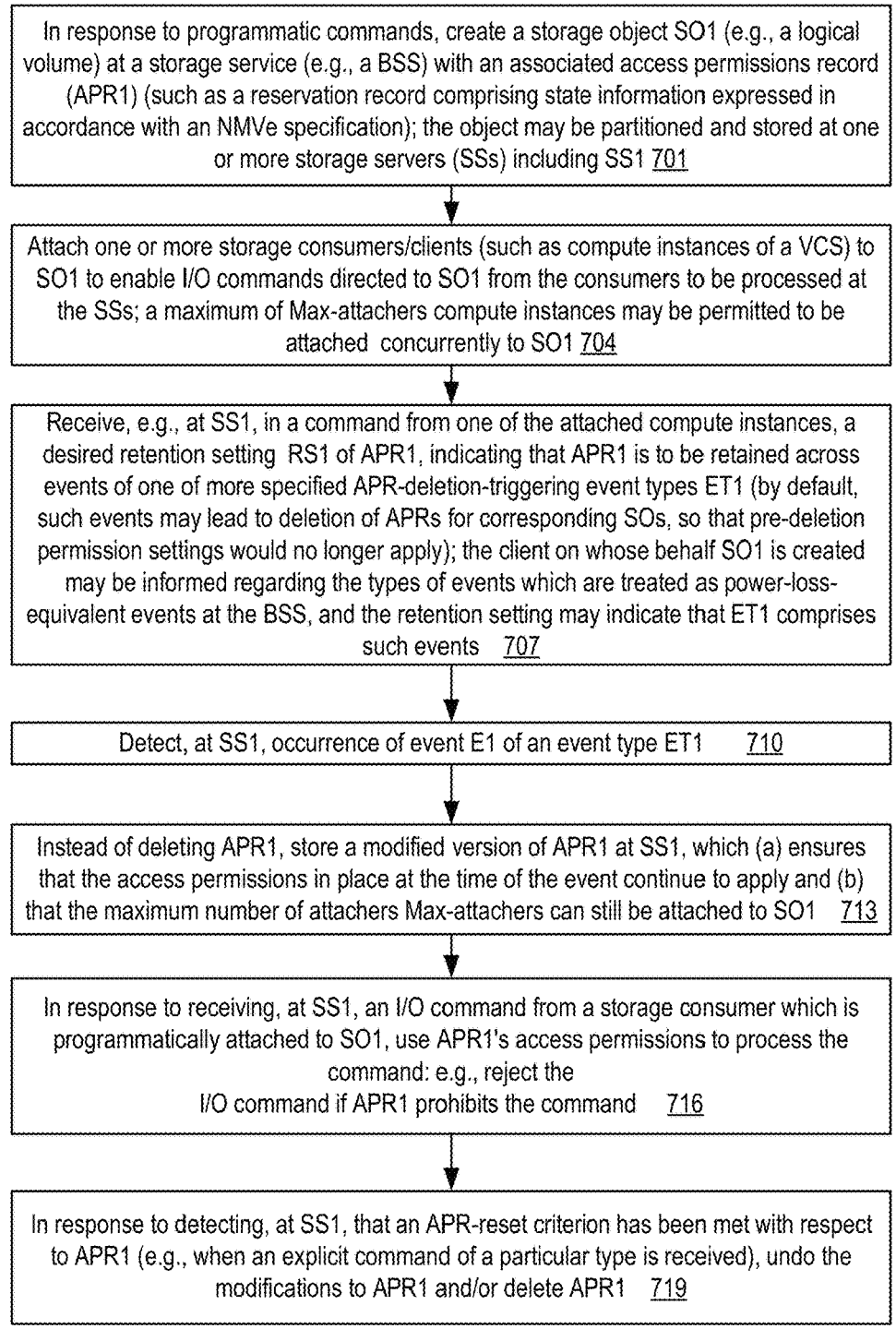
FIG. 7 is a flow diagram illustrating aspects of operations which may be performed to obtain and enforce retention settings for access permissions records of storage objects such as logical volumes, according to at least some embodiments.

FIG. 7 is a flow diagram illustrating aspects of operations which may be performed to obtain and enforce retention settings for access permissions records of storage objects such as logical volumes, according to at least some embodiments. As shown in element 701, a storage object SO1 such as a volume which can be accessed via block-level programmatic interfaces may be created at a storage service (such as a BSS) in response to one or more programmatic commands from a customer of the service. An associated access permissions record APR1 may also be created for SO1, such as a reservation record comprising state information expressed according to an NVMe specification. The object SO1 may be partitioned and stored at one or more storage servers including SS1; in some cases, respective replicas of a given partition may be stored at one primary storage server and one or more non-primary storage servers.

One or more storage consumers or clients (such as compute instances of a VCS) may be programmatically attached to SO1 (element 704), e.g., in response to additional programmatic commands or requests in various embodiments. The attachment of a storage consumer may enable (e.g., be a pre-requisite for) processing of I/O commands from that storage consumer at the relevant storage servers such as SS1. In the depicted embodiment, a maximum of Max-attachers (which may a tunable parameter of the BSS) compute instances may be permitted to be attached to any given storage object such as SO1. Max-attachers may be advertised or made accessible to customers of the BSS, and application accessing the BSS may expect to be able to attach Max-attachers storage consumers to S01 and other similar storage objects; as such, if the BSS were to deny programmatic attachment of an additional storage consumer in a scenario in which the limit of Max-attachers had not yet been reached, this may be considered unexpected or erroneous behavior of the BSS.

As shown in element 707, a desired retention setting RS1 for APR1 may be received at SS1. In some cases RS1 may be sent in a command from one of the attached compute instances; in other embodiments, an administrator of SO1 or a compute instance may submit the retention setting via a different interface (e.g., a control plane interface of the BSS or the VCS) and RS1 may be transmitted to SS1 after it is received via that interface. RS1 may indicate that APR1 is to be retained across (e.g., despite the occurrence of) events of one or more specified APR-deletion-triggering event types ET1. By default, such events may lead to the deletion of the corresponding APRs, so that the earlier-applicable pre-deletion permission settings may no longer apply to the SOs for which the APRs were created. I/O commands directed to a storage object and received after the deletion of the APR of that object may be processed without taking the (now-deleted) permission settings indicated in that APR in various embodiments. In at least some embodiments, the BSS may advertise (e.g., make accessible via BSS documentation or via an API or other interface) the types of events which are treated by the BSS as the equivalent of power-loss events described in storage standards such as versions of NVMe specification. In some embodiments, the retention setting may indicate that ET1 comprises such power-loss-equivalent events. In other embodiments, ET1 may comprise at least some types of events which are not the equivalent of power-loss events. In one embodiment, in which the BSS supports NVMe-compliant commands, the retention setting may be specified simply as an NVMe PTPL setting value. For example, in one implementation, the command indicating the retention setting may set the value to "1" for a PTPL setting emulated for SO1 at the BSS (for retaining APR1 across power-loss events as defined at the BSS), or set the value to "0" (to indicate that the APR1 can be deleted when a power-loss event as defined by the BSS occurs).

At SS1, an occurrence of an event E1 of the APR-deletion-triggering event type ET1 may be detected (element 710) in the depicted embodiment. For example, the event could be detected as a result of an invocation of a detachment API, as a result of a message indicating that an attached compute instance or storage consumer holding a reservation has terminated execution or shut down, and so on.

Instead of deleting APR1, a modified version of APR1 may be stored at SS1 (element 713). In at least some embodiments, the modification (such as the use of a Phantom-AttachmentID) may indicate that APR1 is being retained in accordance with RS1, and/or that the access permissions which were in effect before E1 remain in effect. In effect, using NVMe terminology, a slot for a storage controller may be retained within the modified version of APR1, despite the occurrence of the event, thereby preventing the release or removal of the reservation on the namespace corresponding to the logical volume (SO1). Furthermore, the modifications may be made in such a way in various embodiments that a total of Max-attachers storage consumers can still be attached to SO1. For example, if APR1 comprises a collection of up to Max-attachers entries for storing information about respective attached storage consumers, and one of the entries would be consumed for storing the Phantom-AttachmentID, an extra entry may be initialized within the collection such that up to Max-attachers attachments can continue to be supported for SO1 concurrently. In at least one implementation, the extra entry may be created in advance (e.g., at the time APR1 is initialized), and used as and when events of the targeted type which could potentially lead to the deletion of the APR are detected.

Other storage consumers may be attached to SO1, or some of the storage consumers that were attached prior to E1 may remain attached. An I/O command from such a storage consumer may be received at SS1 (element 716). In response to receiving such a command, APR1's access permissions may be used to process the command—for example, the command may be rejected if APR1 prohibits the operations indicated in the command due to a reservation conflict.

In various embodiments, one or more types of commands supported by the storage service may result in the resetting of APR1. In response to detecting, at SS1, that an APR reset criterion has been met with regard to APR1 (e.g., when such a command is received), the modifications that were made to APR1 may be undone in the depicted embodiment (element 719). In some cases, a command to change the retention setting itself (e.g., to indicate that APR1 deletion is permitted if events of type ET1 occur) may result in the resetting of the APR. In response to commands to delete or reset APR1, the entirety of APR1 (not just the entry containing the modification made upon the detection of the event of type ET1) may be reset or deleted. Examples of other APR resetting commands are provided below.

Figure 8:
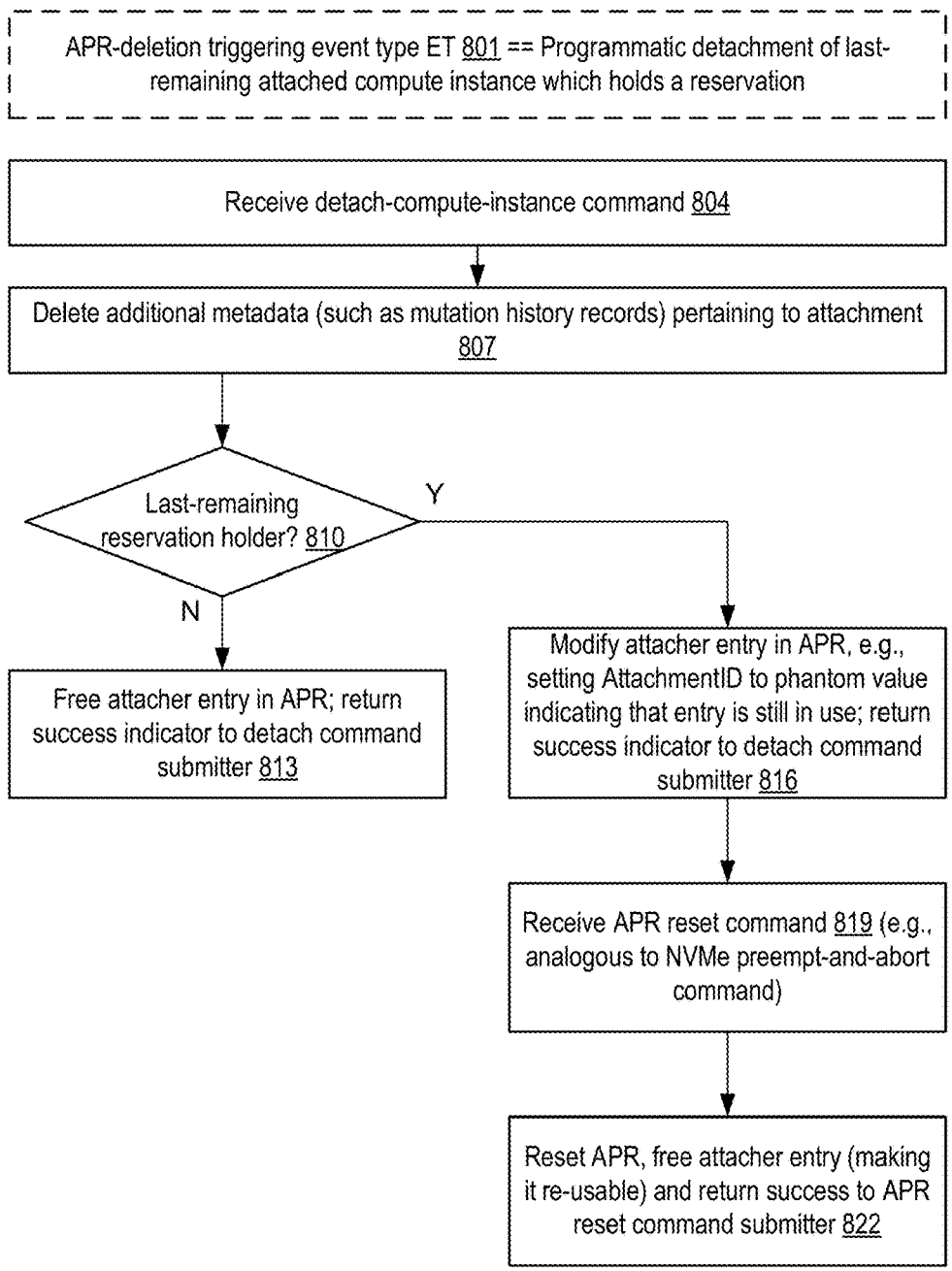
FIG. 8 is a flow diagram illustrating aspects of operations which may be performed in response to a command to detach a compute instance from a logical volume, in a scenario in which the access permissions record of the logical volume may by default be deleted in the event of a detachment of the last attached compute instance which holds a reservation on the logical volume, according to at least some embodiments.

FIG. 8 is a flow diagram illustrating aspects of operations which may be performed in response to a command to detach a compute instance from a logical volume, in a scenario in which the access permissions record of the logical volume may by default be deleted in the event of a detachment of the last attached compute instance which holds a reservation on the logical volume, according to at least some embodiments. In the scenarios depicted in FIG. 8, FIG. 9 and FIG. 10, an APR deletion-triggering event type ET 801 is assumed to be a programmatic detachment of the last remaining attached compute instance which holds a reservation on a storage object such as a logical volume. Furthermore, APRs with fields similar to those shown in FIG. 6 are assumed to be in use.

As shown in element 804, a detach-compute-instance command may be received at a BSS similar in features and functionality to BSS 102 of FIG. 1, e.g., at a control plane component of the BSS or at a storage server at which a portion of the logical volume is stored. Additional metadata which was being stored at the BSS, pertaining to the attachment for which the detach command is received, may be deleted so as to free up resources in the depicted embodiment (element 807). Such additional metadata may include for example metrics of the command which were submitted from the attached compute instance, logs or records indicating the sequence in which commands were submitted from the compute instance, and so on.

A determination may be made as to whether the compute instance whose detachment is requested is the last-remaining reservation holder (element 810). If the compute instance is not the last-remaining reservation holder, the attach entry corresponding to the compute instance may be freed (e.g., by resetting its fields), and a success indicator may be returned to the submitter of the detach command (element 813). The resetting of the fields may enable that attacher entry to be re-used, e.g., to store information about other compute instances that are subsequently attached (or the same compute instance if it is later re-attached).

If the compute instance is the last-remaining reservation holder (as also determined in operations corresponding to element 810), a different approach may be taken in the depicted embodiment. The compute instance's attacher entry in the APR may be modified, e.g., by setting the AttachmentID field to a special purpose phantom value indicating that the attacher entry remains in use (element 816). A success indicator may be returned to the submitter of the detach command.

An APR reset command for the logical volume may later be received (element 819) at the BSS. For example, a command analogous to the NVMe reservation preempt-and-abort command may be received. In response, the APR for the logical volume may be reset (e.g., by setting fields to null values or zeroes), and this reset may also result in freeing the attacher entry which was modified in operations corresponding to element 816. A success indicator may be returned to the APR reset command submitter in the depicted embodiment (element 822). The freed attacher entry may subsequently be re-used as needed. In some cases, the preempt-and-abort command may result in the removal of the reservation metadata for the namespace or logical volume.

Figure 9:
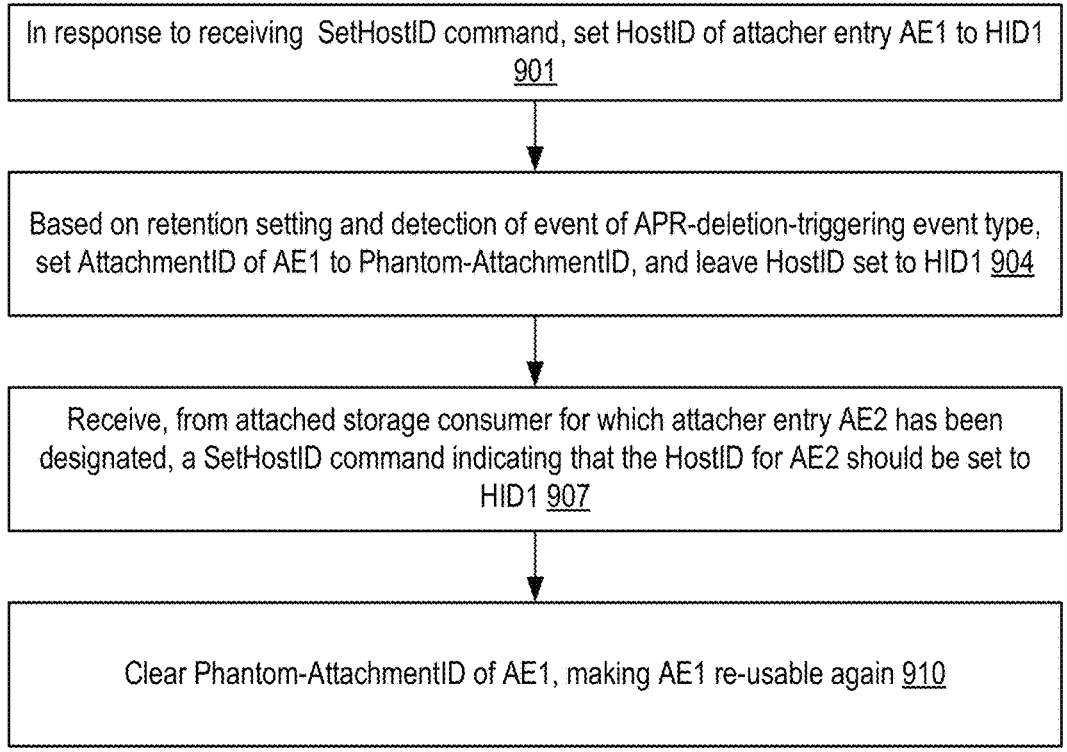
FIG. 9 is a flow diagram illustrating aspects of operations which may be performed in response to commands to set host identifiers of attached storage clients of a logical volume, according to at least some embodiments.

FIG. 9 is a flow diagram illustrating aspects of operations which may be performed in response to commands to set host identifiers of attached storage clients of a logical volume, according to at least some embodiments. In the depicted embodiment, host identifier fields within APRs may be set in response to programmatic "SetHostID" commands from compute instances or from administrators. As indicated earlier, the host identifier set for a given compute instance need not be based on, or dependent upon, an identifier of the virtualization host at which the compute instance runs in at least some embodiments. A given virtualization host could be used for several compute instances, each of which could submit I/O commands to the same logical volume of the BSS, so using an identifier of the virtualization host may not necessarily help in distinguishing among entities (to which respective differing access permissions may have been granted) from which I/O commands are received. Instead, in various embodiments the host identifier may be a string or numeral generated for a given compute instance (e.g., from a pre-selected permissible range of values, defined at the BSS or the VCS). The concept of "hosts" being the entities from which I/O commands are received, and to which reservations or access permissions are granted, may be used in cloud-based BSSs for compatibility with terms and concepts in storage standard specifications.

In response to receiving a SetHostID command, e.g., from a storage consumer such as a compute instance which is programmatically attached to a logical volume, the HostID field of the attacher entry AE1 for the compute instance within an APR for the logical volume may be set to a value HID1 (element 901) in the depicted embodiment. The AttachmentID field of the entry AE1 may be set to an attachment identifier generated when the compute instance or storage consumer is programmatically attached to the logical volume.

Based on the retention setting for APR, and detection of an APR-deletion-triggering event, the AttachmentID of AE1 may be set to a special value Phantom-AttachmentID as described earlier (element 904). The HostID field may be left set at HID1. Because of the setting of the Phantom-AttachmentID, AE1 may not be re-used, at least temporarily, to represent some other attached storage consumer. In at least some embodiments, no more than one attacher entry may be permitted to have an AttachmentID set to Phantom-Attachment at any given time.

Another attacher entry AE2 within the APR (one which is currently free and re-usable) may be designated for a storage consumer in response to an attachment command in the depicted embodiment. For this attachment command, an attachment ID may be selected from the permissible range for legal/acceptable attachment IDs (which does not include Phantom-AttachmentID). A SetHostID command may be received at a storage server of the BSS, indicating that the HostID of AE2 should be set to HID1 (and hence any permissions granted to the storage consumer identified by HID1 should apply to the consumer for which AE2 is being used) (element 907). In response, the HostID field of AE2 may be set to HID1, and the Phantom-AttachmentID field of AE1 may be cleared or reset (along with other fields of AE1 in some implementations) (element 910). This may in effect free AE1 and make AE1 re-usable again; there may be no need to continue using the Phantom-AttachmentID as there is now another entry (AE2) indicating a storage consumer to which the permissions granted to the entity identified via HID1 (so there is once again at least one attached storage consumer which has a reservation, so that the deletion-triggering criteria are no longer met).

Figure 10:
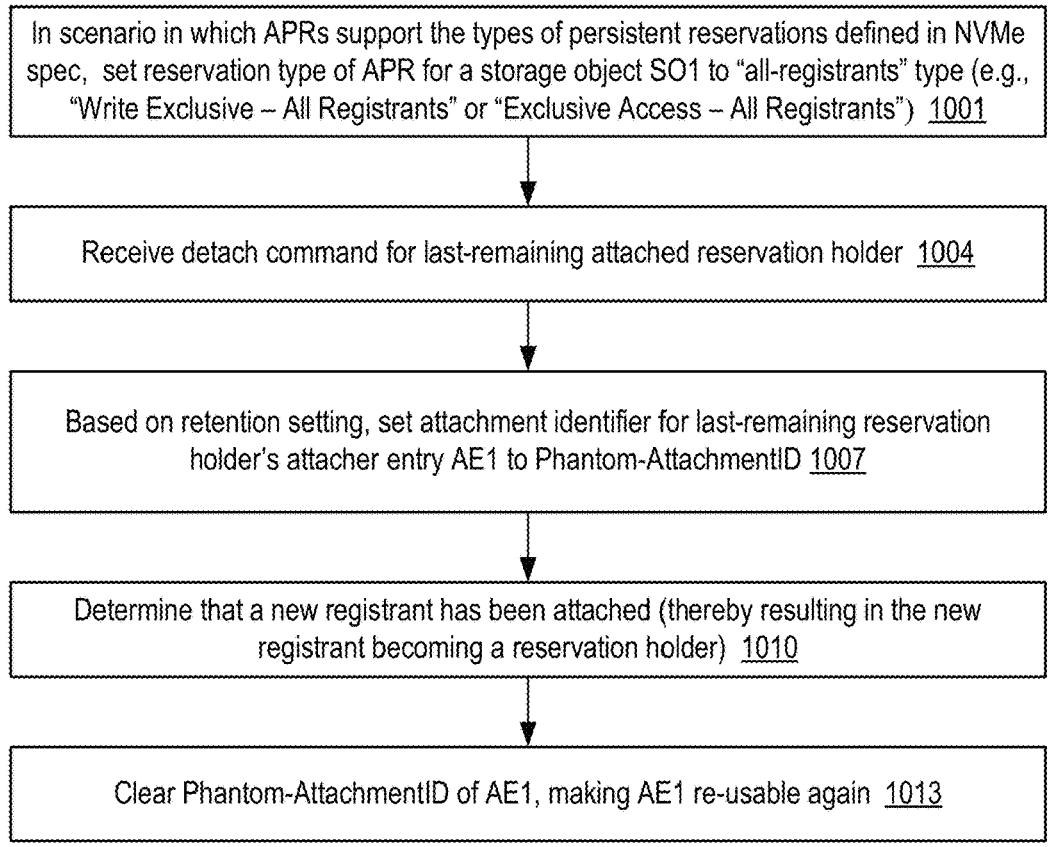
FIG. 10 is a flow diagram illustrating aspects of operations, pertaining to reusing attacher entries of a reservation record of a logical volume in a scenario in which multiple concurrent reservation holders are permitted, according to at least some embodiments.

FIG. 10 is a flow diagram illustrating aspects of operations, pertaining to reusing attacher entries of a reservation record of a logical volume in a scenario in which multiple concurrent reservation holders are permitted, according to at least some embodiments. In the embodiment depicted in FIG. 10, reservation types of the kind shown in FIG. 2 may be used at the BSS to manage access control for logical volumes. The "Reservation Holder Definition" column of two of the six reservation types shown in FIG. 2 ("Write Exclusive-All Registrants" and "Exclusive Access-All Registrants") indicates that for these reservation types, there may be several reservation holders concurrently. These two reservation types may be referred to collectively as "all-registrants" types. For example, if several compute instances are registered as consumers of the logical volume with the BSS (e.g., in response to registration commands), and the reservation type for the logical volume is set to "Exclusive Access-All Registrants", all the registered compute instances may be considered holders of the reservation, and reads and well as writes may be permitted to all registered compute instances.

The reservation type for a storage object SO1 of a BSS may be set to one of the "all-registrants" types at a storage server at which a partition of SO1 is stored, as shown in element 1001, e.g., in response to a programmatic command received from a storage consumer such as a compute instance, or in response to a command submitted by an administrator. Over time, one or more storage consumers may be registered to access SO1, thereby be designated as holders of the reservation on SO1, and may be granted the permissions defined for the "all-registered" reservation type which is in use. Individual ones of such storage consumers may have distinct host identifiers set via SetHostID commands in at least some embodiments. As long as at least one registrant storage consumer remains attached to SO1, the triggering condition for deleting the APR for SO1 may not be met.

At some point, the triggering condition for deleting SO1's APR may be met—e.g., a detachment command for the last remaining attached registrant may be received (element 1004). Based on a retention setting of the kind introduced herein, the attachment identifier of the attacher entry AE1 of the last-remaining reservation holder may be set to Phantom-AttachmentID as indicated above (element 1007), indicating that AE1 cannot currently be re-used. Note that in some implementations, compute instances may be programmatically attached to a logical volume without being configured as registrants. If such a compute instance issues a write I/O command after the Phantom-AttachmentID is set, that write I/O command may be rejected in at least some implementations, e.g., because the compute instance is not a registrant and only registrants are permitted to perform writes as per the reservation type in use.

A determination may later be made at the storage server or the BSS that a new registrant storage consumer has been added or attached (element 1010). Because the reservation type is an "all-registrants" type, that storage consumer automatically becomes a holder of the reservation, so the triggering condition for deleting the APR no longer holds in the depicted embodiment. Accordingly, the Phantom-AttachmentID of AE1 may be cleared or reset, making AE1 re-usable again (element 1013).

It is noted that in various embodiments, some of the operations shown in the flow diagrams of FIG. 7, FIG. 8, FIG. 8, FIG. 9, and/or FIG. 10, may be implemented in a different order than that shown in the corresponding figure, or may be performed in parallel rather than sequentially.

Additionally, some of the operations shown in these flow diagrams may not be required in one or more implementations. In at least some embodiments, at least a subset of the operations shown in the flow diagrams of FIG. 7-FIG. 10 may be performed by a reservation manager of the BSS, similar in functionality to APR managers 188 shown in FIG. 1.

As indicated earlier, the techniques introduced herein for retaining access permission metadata of storage objects such as logical volumes based on customer-specified retention settings may be implemented at a BSS of a cloud provider network or cloud computing environment which also includes a VCS whose compute instances are the consumers or accessors of the storage objects. Any of a variety of storage technologies can be utilized for the logical volumes, including for example solid-state drives (SSDs) implementing programmatic commands of NVMe or similar standards, magnetic disk drives, and so on. In some cases, RAID (random arrays of independent/inexpensive disks) arrays can be utilized for the volumes, or SLEDs (single large expensive disks) can be used.

A fault-tolerant protocol for the distribution of logical volume reservation state information among the different BSS storage servers used for the partitions of the volume, and among the compute instances attached to the volume, may be implemented in some embodiments using the existing connections established between the compute instances and the storage servers for I/O operations, without requiring new connections to be set up for the distribution of reservation state. One of the storage servers being used for the logical volume can be designated as the coordinator of changes to the reservation state; as such, requests to modify the reservation state can be sent initially to the designated coordinator according to the protocol. If/when a change to reservation state is approved by the designated coordinator, the reservation sequence number (RSN) associated with the reservation can be incremented to reflect the change. The RSN can serve as an indicator of the version of reservation state which has been approved or applied by the designated coordinator, and the RSN can be included with I/O requests submitted to the storage server at which a targeted partition of the volume is stored. A RSN submitted with an I/O request to a given storage server can be compared with a locally stored RSN by that storage server to determine whether the version of reservation state known at the compute instance from which the I/O request is received is up-to-date or not; if the version is not up-to-date, the compute instance can be informed of the staleness of its reservation metadata by the storage server, and the compute instance can obtain the updated version of the reservation state from the designated coordinator.

A cloud provider network (sometimes referred to simply as a "cloud") at which a BSS or a VCS may be implemented refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be programmatically attached to logical volumes implemented at a BSS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the BSS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS and the BSS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the BSS and/or the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 11:
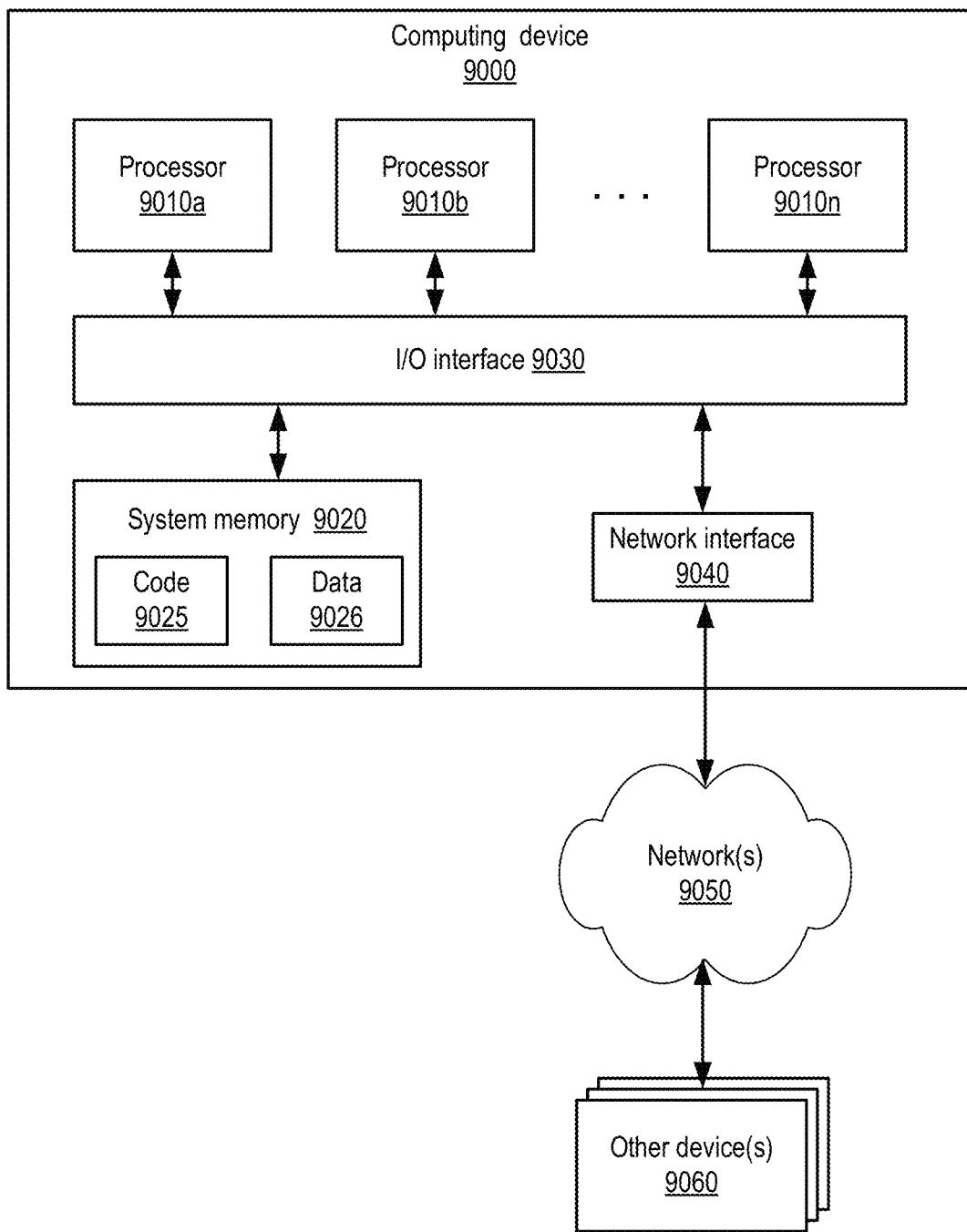
FIG. 11 is a block diagram illustrating an example computing device that may be used in at least some embodiments.

In at least some embodiments, a server that implements the types of techniques described herein (e.g., including the described functionality of BSS servers, VCS virtualization hosts and the like), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
a first compute instance of a virtualized computing service; and
a storage server of a block storage service, wherein the storage server stores a portion of a first logical volume, a portion of a second logical volume, a first reservation record of the first logical volume, and a second reservation record of the second logical volume, wherein the first reservation record indicates access permissions granted with respect to the first logical volume to one or more compute instances including the first compute instance, and wherein the second reservation record indicates access permissions granted with respect to the second logical volume to one or more compute instances;

wherein the first compute instance is configured to:
transmit, to the storage server, a first retention setting of the first reservation record, wherein the first retention setting indicates that the first reservation record is to be retained across events, pertaining to the first logical volume, of a reservation-deletion-triggering event type; and wherein the storage server is configured to:
in response to an occurrence of a first event, pertaining to the second logical volume, of the reservation-deletion-triggering event type, delete the second reservation record in accordance with a second retention setting of the second reservation record, wherein the second retention setting differs from the first retention setting;

perform, subsequent to deletion of the second reservation record, an operation indicated in a first I/O (input/output) command directed to the portion of the second logical volume, without checking access permissions stored in the second reservation record;

in response to an occurrence of a second event, pertaining to the first logical volume, of the reservation-deletion-triggering event type after the first retention setting is received, store a version of the first reservation record in accordance with the first retention setting; and in response to receiving a second I/O command directed to the portion of the first logical volume after the occurrence of the second event, reject the second I/O command based at least in part on an access permission indicated in the version of the first reservation record.

2. The system as recited in claim 1, wherein the first reservation record includes one or more access permissions defined in an NVMe (Non-Volatile Memory-Express) specification.

3. The system as recited in claim 1, wherein the first event comprises a programmatic detachment, from the first logical volume, of a holder of an access permission indicated in the first reservation record.

4. The system as recited in claim 1, wherein the first event comprises a termination of execution of a holder of an access permission indicated in the first reservation record.

5. The system as recited in claim 1, wherein the first event comprises an event defined by a customer of the block storage service.

6. A computer-implemented method, comprising:
receiving, at a storage server via a programmatic interface, a retention setting of a permissions record of a storage object, wherein the storage server stores at least a portion of the storage object, wherein the permissions record indicates access permissions granted with respect to the storage object to one or more storage consumers, and wherein the retention setting indicates that the permissions record is to be retained across events, pertaining to the storage object, of a particular event type;

in response to an occurrence of an event, pertaining to the storage object, of the particular event type after the retention setting is received, storing, at the storage server, a version of the permissions record in accordance with the retention setting; and in response to receiving an I/O command directed to the portion of the storage object after the occurrence of the event, process the I/O command based at least in part on an access permission indicated in the version of the permissions record.

7. The computer-implemented method as recited in claim 6, wherein the retention setting is received via the programmatic interface from a storage consumer of the one or more storage consumers.

8. The computer-implemented method as recited in claim 6, wherein the permissions record includes one or more access permissions defined in an NVMe (Non-Volatile Memory-Express) specification.

9. The computer-implemented method as recited in claim 6, wherein the event comprises a programmatic detachment, from the storage object, of a holder of an access permission indicated in the permissions record.

10. The computer-implemented method as recited in claim 6, wherein the event comprises a termination of execution of a holder of an access permission indicated in the permissions record.

11. The computer-implemented method as recited in claim 6, further comprising:
providing, in response to a query received via another programmatic interface, an indication that the retention setting applies to the permissions record.

12. The computer-implemented method as recited in claim 6, wherein the storage object comprises a logical volume which can be accessed from a storage consumer via a block-level programmatic interface.

13. The computer-implemented method as recited in claim 6, wherein the permissions record includes a collection of reusable storage consumer entries, wherein individual storage consumer entries of the collection indicate a respective compute instance which is programmatically attached to the storage object, the computer-implemented method further comprising:
modifying, subsequent to the occurrence of the event, a particular storage consumer entry of the collection to indicate that the particular storage consumer entry is not to be overwritten in response to a command to attach another compute instance to the storage object, wherein the version of the permissions record includes a modified version of the particular storage consumer entry obtained as a result of the modifying.

14. The computer-implemented method as recited in claim 13, wherein the individual storage consumer entries comprise (a) a respective attachment identifier field associated with the respective compute instance and (b) a respective host identifier field associated with the respective compute instance, wherein prior to said modifying the particular storage consumer entry, (a) an attachment identifier field of the particular storage consumer entry is set to a particular attachment identifier and (b) a host identifier field of the particular storage consumer entry is set to a particular host identifier, and wherein said modifying the particular storage consumer entry comprises:
setting the attachment identifier field to a particular value indicative of the retention setting, and leaving the host identifier field set to the particular host identifier.

15. The computer-implemented method as recited in claim 14, further comprising:
in response to receiving, at the storage server after the I/O command has been processed, a command to set the host identifier field of another storage consumer entry to the particular host identifier;
setting the host identifier field of the other storage consumer entry to the particular host identifier; and
modifying the particular storage consumer entry to indicate that overwriting of the particular storage consumer entry in response to a command to attach a compute instance is permitted.

16. A computer-implemented method, comprising:

storing, at a storage server, a permissions record of a storage object, wherein at least a portion of the storage object is stored at the storage server, and wherein in accordance with the permissions record, one or more storage consumers are prohibited from performing a type of I/O (input/output) operation on the portion of the storage object;

in response to detecting an event of a deletion triggering event type with respect to the permissions record, generating and storing, at the storage server, a modified version of the permissions record, wherein the modified version of the permissions record indicates that the one or more storage consumers remain prohibited from performing the type of I/O operation on the portion of the storage object; and in response to receiving, at the storage server after the modified version of the permissions has been stored, a command to perform a particular I/O operation directed to the portion of the storage object from a particular storage consumer, processing the command based at least in part on the modified version of the permissions record.

17. The computer-implemented method as recited in claim 16, further comprising:

in response to receiving, at the storage server, a command to delete the permissions record after the command to perform the particular I/O operation has been processed, deleting the permissions record.

18. The computer-implemented method as recited in claim 16, wherein said detecting the event of the deletion triggering event type comprises:

detecting that no storage consumer remains programmatically attached to the storage object.

19. The computer-implemented method as recited in claim 16, further comprising:

receiving, at the storage server via a programmatic interface prior to detecting the event, a retention setting of the permissions record, wherein the modified version is generated and stored based at least in part on the retention setting.

20. The computer-implemented method as recited in claim 16, wherein the storage server is part of a collection of storage servers of a storage service of a cloud provider network, and wherein the particular storage consumer is a compute instance of a computing service of the cloud provider network.

* * * * *